United States Patent
Ichimiya

(10) Patent No.: US 9,332,174 B2
(45) Date of Patent: May 3, 2016

(54) FOCUS DETECTION APPARATUS, IMAGING APPARATUS, AND CONTROL METHOD OF FOCUS DETECTION APPARATUS

(71) Applicant: CANON KABUSHIKI KAISHA, Tokyo (JP)

(72) Inventor: Takashi Ichimiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 13/974,786

(22) Filed: Aug. 23, 2013

(65) Prior Publication Data

US 2014/0063328 A1    Mar. 6, 2014

(30) Foreign Application Priority Data

Sep. 5, 2012 (JP) ................................. 2012-195497

(51) Int. Cl.
*H04N 5/232*    (2006.01)

(52) U.S. Cl.
CPC ................................. *H04N 5/23212* (2013.01)

(58) Field of Classification Search
CPC ............... H04N 5/23212; G03B 13/32–13/36; G02B 7/05–7/105
See application file for complete search history.

(56) References Cited

U.S. PATENT DOCUMENTS

| 5,182,658 A * | 1/1993 | Ishizaki | G02B 7/36 348/297 |
| 5,526,088 A * | 6/1996 | Kusaka | G02B 7/34 396/111 |
| 8,184,188 B2 * | 5/2012 | Yaghmai | H04N 5/35581 348/294 |
| 2004/0051801 A1 * | 3/2004 | Iizuka | H01L 27/14609 348/294 |
| 2008/0036888 A1 * | 2/2008 | Sugawa | H04N 3/1568 348/294 |

FOREIGN PATENT DOCUMENTS

| JP | 03-010473 A | 1/1991 |
| JP | 09-046596 A | 2/1997 |
| JP | 2000-012820 A | 1/2000 |

* cited by examiner

*Primary Examiner* — Lin Ye
*Assistant Examiner* — Peter Chon
(74) *Attorney, Agent, or Firm* — Cowan, Liebowitz & Latman, P.C.

(57) ABSTRACT

A focus detection apparatus comprises a pair of line sensors that generate a pair of image signals by photo-electrically converting an object image, calculation unit configured to calculate a defocus amount using the image signals, and control unit configured to control the line sensors to execute a charge accumulation operation until output levels of the line sensors reach a first voltage level based on a saturated voltage, wherein the control unit switches the saturated voltage based on luminance information.

16 Claims, 21 Drawing Sheets

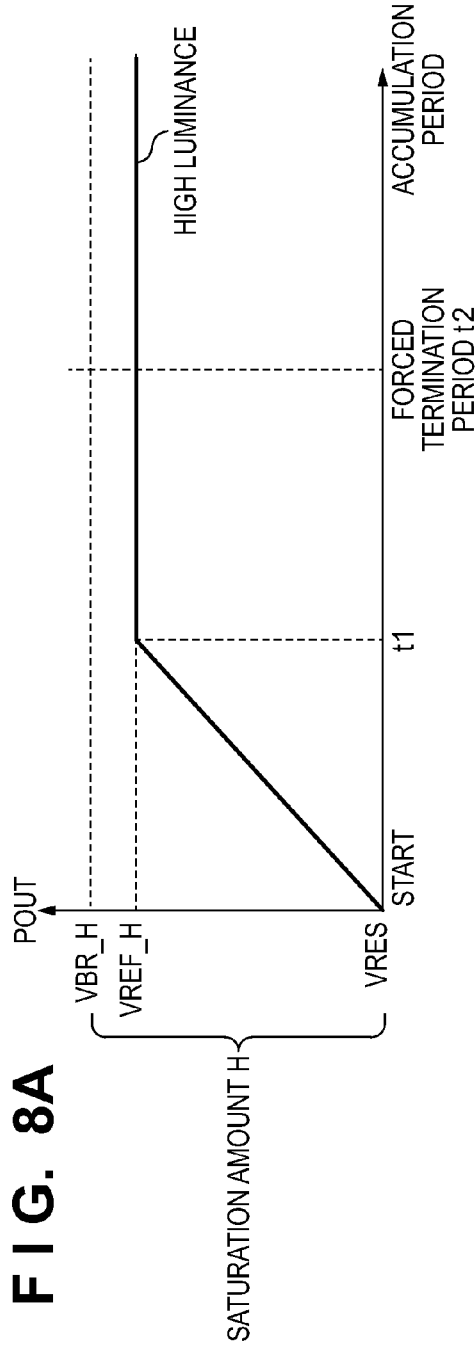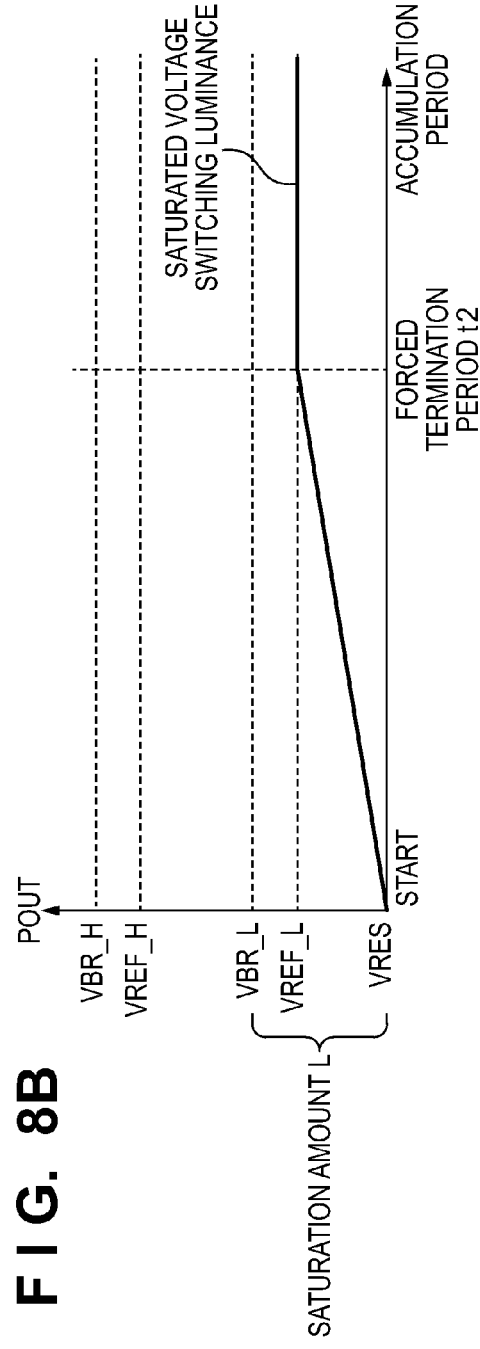

F I G. 16
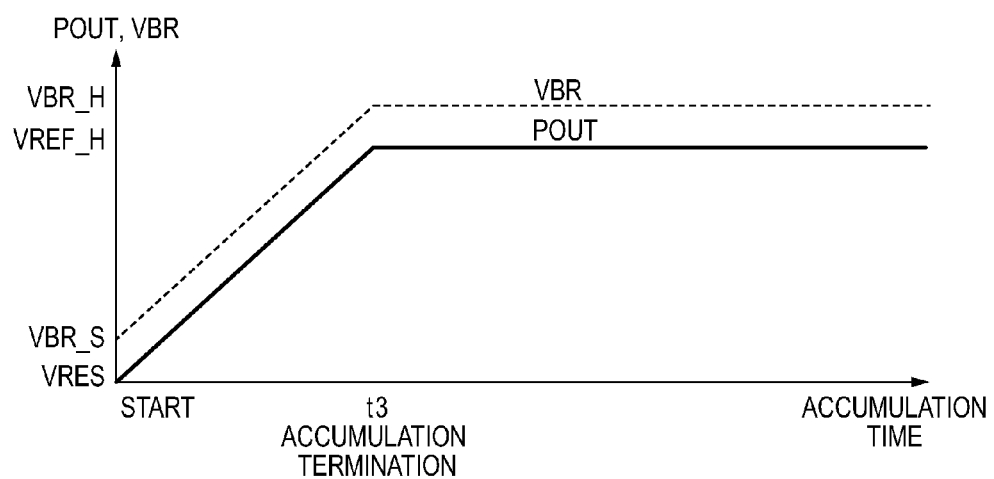

FOCUS DETECTION APPARATUS, IMAGING APPARATUS, AND CONTROL METHOD OF FOCUS DETECTION APPARATUS

BACKGROUND OF THE INVENTION

1. Field of the Invention

The present invention relates to a focus detection apparatus of a phase-difference detection method and an imaging apparatus including the focus detection apparatus.

2. Description of the Related Art

A solid-state image sensor using a photo-electric conversion element is used in various fields. For example, as an automatic focus detection method of a camera, a phase-difference detection method is generally known. In the phase-difference detection method, light rays which come from an object and have passed through different exit pupil regions of an imaging lens are imaged on a solid-state image sensor. The solid-state image sensor includes a plurality of line sensor pairs. The control means of a focus detection apparatus calculates relative positions of a pair of object images obtained by photo-electric conversion (phase-difference calculation), thus detecting a defocus amount.

When an accumulation period (photo-electric conversion period) of the solid-state image sensor is prolonged, dark current noise is generated, thus impairing focus detection precision in a low-luminance environment. Thus, a technique for correcting this dark current noise generated by a photo-electric conversion element has been proposed.

For example, in Japanese Patent Laid-Open No. H3-10473, a dark current detection unit which is not irradiated with light is arranged on a part of a line sensor, and a ratio of dark current components generated by respective pixels of the line sensor and those generated by the dark current detection unit is stored in advance. Then, the outputs from the respective pixels are multiplied with a stored coefficient to calculate dark current components of the respective pixels, thus attaining dark current correction.

Also, each photo-electric conversion element has a limitation on a voltage that can be accumulated (to be referred to as a saturated voltage hereinafter). When this saturated voltage is exceeded, overflowed charges are leaked to other adjacent photo-electric conversion elements. Thus, in Japanese Patent Laid-Open No. 2000-12820, an overflow drain switch is connected to each photo-electric conversion element, and overflowed charges are flowed toward the circuit side via this switch, thus preventing the charges from leaking. Since saturated voltages suffer manufacturing variations for respective elements, a function of adjusting a gate voltage of each overflow drain switch is provided.

However, with the technique disclosed in Japanese Patent Laid-Open No. H3-10473, an average dark current generated by the photo-electric conversion elements can be removed, but dark current shot noise as random components cannot be corrected. It is effective to reduce the dark current shot noise by decreasing an absolute value of a generated dark current amount.

FIGS. 20A to 20E are explanatory views of the technique disclosed in Japanese Patent Laid-Open No. 2000-12820. A gate OFF voltage of a transfer switch 2 is adjusted for each switch so as not to exceed a depletion voltage of a photodiode 1 and to set a sufficiently high saturated voltage. However, when the saturated voltage is high, a difference between the gate voltage of the transfer switch 2 as the overflow drain switch and a cathode voltage of the photodiode 1 (gate-source voltage Vgs) is increased. FIG. 21 shows the relationship between a dark current Idk generated by the transfer switch 2 and the voltage Vgs. As the voltage Vgs is higher, the dark current Idk to be generated increases exponentially. That is, when the gate OFF voltage of the transfer switch 2 is set to increase the saturated voltage, dark current noise is increased in a low-luminance environment, thus impairing the SN of a signal obtained by each photo-electric conversion element.

SUMMARY OF THE INVENTION

The present invention has been made in consideration of the aforementioned problems, and provides a solid-state image sensor which can attain satisfactory focus adjustment even in broader luminance environments.

According to a first aspect of the present invention, there is provided a focus detection apparatus comprising: a pair of line sensors that generate a pair of image signals by photo-electrically converting an object image; calculation unit configured to calculate a defocus amount using the image signals; and control unit configured to control the line sensors to execute a charge accumulation operation until output levels of the line sensors reach a first voltage level based on a saturated voltage, wherein the control unit switches the saturated voltage based on luminance information.

According to a second aspect of the present invention, there is provided an imaging apparatus, which comprises the above focus detection apparatus, comprising: imaging unit configured to generate an image signal by photo-electrically converting an object image; and lens driving unit configured to control a position of an imaging lens based on the defocus amount.

According to a third aspect of the present invention, there is provided a focus detection apparatus comprising: a pair of line sensors that generate a pair of image signals by photo-electrically converting an object image; calculation unit configured to calculate a defocus amount using the image signals; and control unit configured to control the line sensors to execute a charge accumulation operation until output levels of the line sensors reach a first voltage level based on a saturated voltage, wherein the control unit switches the saturated voltage based on a sensitivity of the line sensors.

According to a fourth aspect of the present invention, there is provided an imaging apparatus, which comprises the above focus detection apparatus, comprising: imaging unit configured to generate an image signal by photo-electrically converting an object image; and lens driving unit configured to control a position of an imaging lens based on the defocus amount.

According to a fifth aspect of the present invention, there is provided a control method of a focus detection apparatus, which includes a pair of line sensors that generate a pair of image signals by photo-electrically converting an object image, the method comprising: calculating a defocus amount using the image signals; and controlling the line sensors to execute a charge accumulation operation until output levels of the line sensors reach a first voltage level based on a saturated voltage, wherein the saturated voltage is switched based on luminance information.

According to a sixth aspect of the present invention, there is provided a control method of a focus detection apparatus, which includes a pair of line sensors that generate a pair of image signals by photo-electrically converting an object image, the method comprising: calculating a defocus amount using the image signals; and controlling the line sensors to execute a charge accumulation operation until output levels of the line sensors reach a first voltage level based on a saturated voltage, wherein the saturated voltage is switched based on a sensitivity of the line sensors.

Further features of the present invention will become apparent from the following description of exemplary embodiments with reference to the attached drawings.

BRIEF DESCRIPTION OF THE DRAWINGS

FIGS. 8A and 8B are graphs showing a signal POUT in the AF sensor;

FIG. 16 is a graph showing the relationship between a signal POUT and voltage VBR according to the fourth embodiment of the present invention;

DESCRIPTION OF THE EMBODIMENTS

Embodiments of the present invention will be described in detail hereinafter with reference to the accompanying drawings.

First Embodiment

Figure 1:
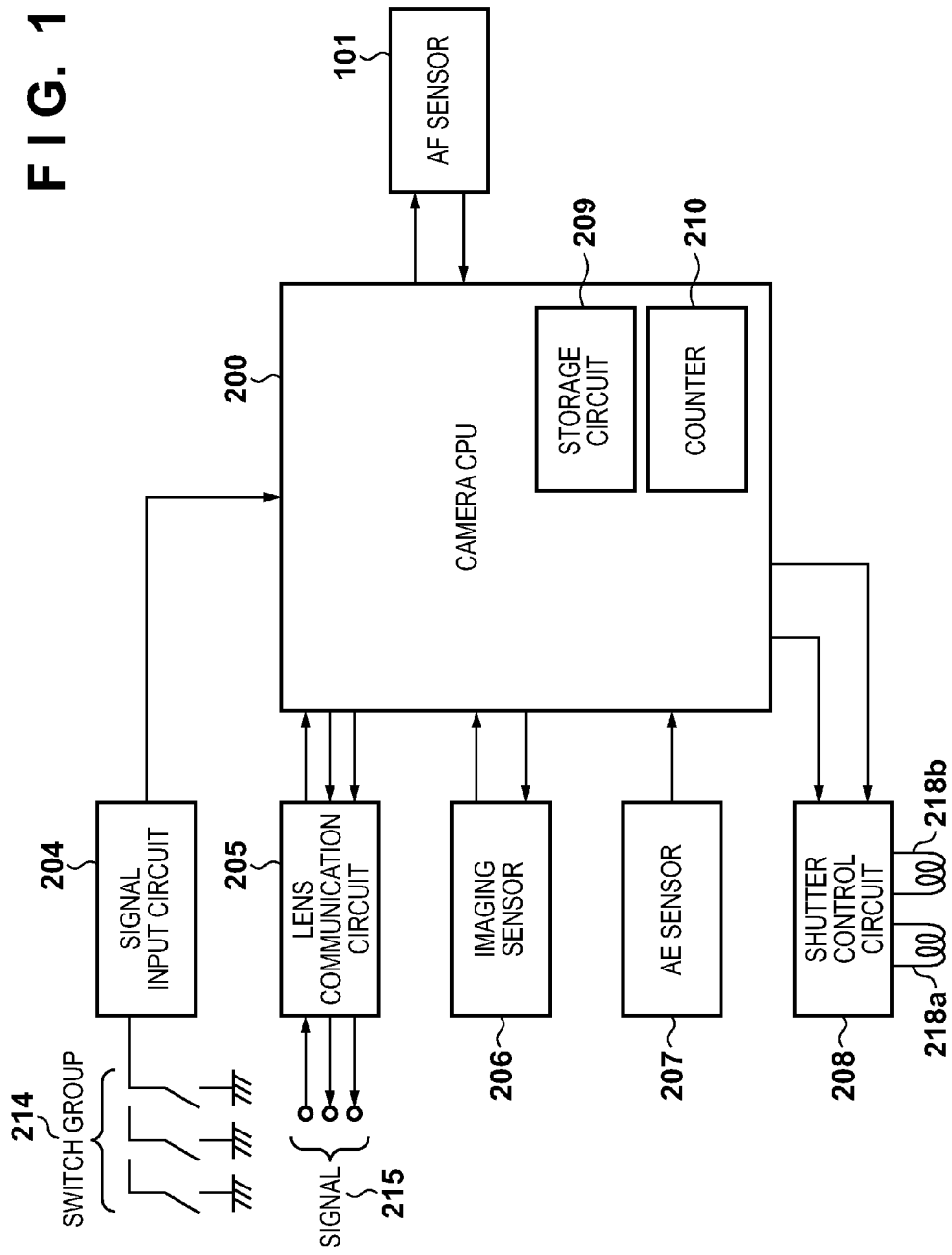
FIG. 1 is a block diagram showing the arrangement of a camera according to the first embodiment of the present invention.

FIG. 1 is a block diagram showing the arrangement of a digital camera as an imaging apparatus according to the first embodiment of the present invention. To a camera CPU 200, a signal input circuit 204 used to detect a switch group 214 for various operations of the camera, an imaging sensor (imaging element) 206, and an AE sensor 207 are connected. Also, a shutter control circuit 208 used to control shutter magnets 218a and 218b and an AF sensor 101 are connected. The camera CPU 200 controls a focal point position and aperture by exchanging signals 215 with an imaging lens 300 (see FIG. 2) via a lens communication circuit 205.

The switch group 214 is an operation unit which includes operation members required to operate the camera such as a power switch used to turn on/off a power supply of the camera, a release button, and a setting button used to select various imaging modes. When these switches and buttons are operated, signals according to the operations are input to the signal input circuit 204.

Note that to the release button, a switch SW1 which is turned on by a first stroke operation (half-pressing operation) of the release button operated by a photographer and a switch SW2 which is turned on by a second stroke operation (full-pressing operation) of the release button are connected.

The AF sensor 101 includes line sensors. The camera CPU 200 controls the AF sensor 101 to detect a defocus amount from an object contrast distribution obtained by the line sensors, thereby controlling a position of the imaging lens 300 (see FIG. 2).

The camera CPU 200 controls the AE sensor 207 to detect an object luminance, thereby deciding an aperture value of the imaging lens (not shown) and shutter speed. Then, the camera CPU 200 controls the aperture value via the lens communication circuit 205, controls the shutter speed by adjusting the magnets 218a and 218b via the shutter control circuit 208, and further controls the imaging sensor 206, thus attaining an imaging operation.

The camera CPU 200 incorporates a storage circuit 209 such as a ROM which stores a program used to control a camera operation, a RAM used to store variables, and an EEPROM (electrically erasable rewritable memory) used to store various parameters. Furthermore, the camera CPU 200 incorporates a counter 210 used to measure a time period.

The optical arrangement of the camera will be described below with reference to FIG. 2. Most of a light beam which comes from an object and enters via the imaging lens 300 is reflected upward by a quick return mirror 305, and is imaged as an object image on a finder screen 303. The user of the camera can observe this image via a pentagonal prism 301 and eyepiece lens 302. Some rays of an imaging light beams are transmitted through the quick return mirror 305, are deflected downward by a sub-mirror 306 behind the mirror 305, and are imaged on the AF sensor 101 via a field mask 307, field lens 311, stop 308, and secondary imaging lens 309. The AF sensor 101 includes a plurality of line sensor pairs, and calculates a phase difference between image signals photo-electrically converted by the line sensors, thus detecting a focus state of the imaging lens 300. In case of an imaging operation, the quick return mirror 305 is flipped up, and a full light beam is imaged on the imaging sensor 206, thus exposing an object image.

Figure 2:
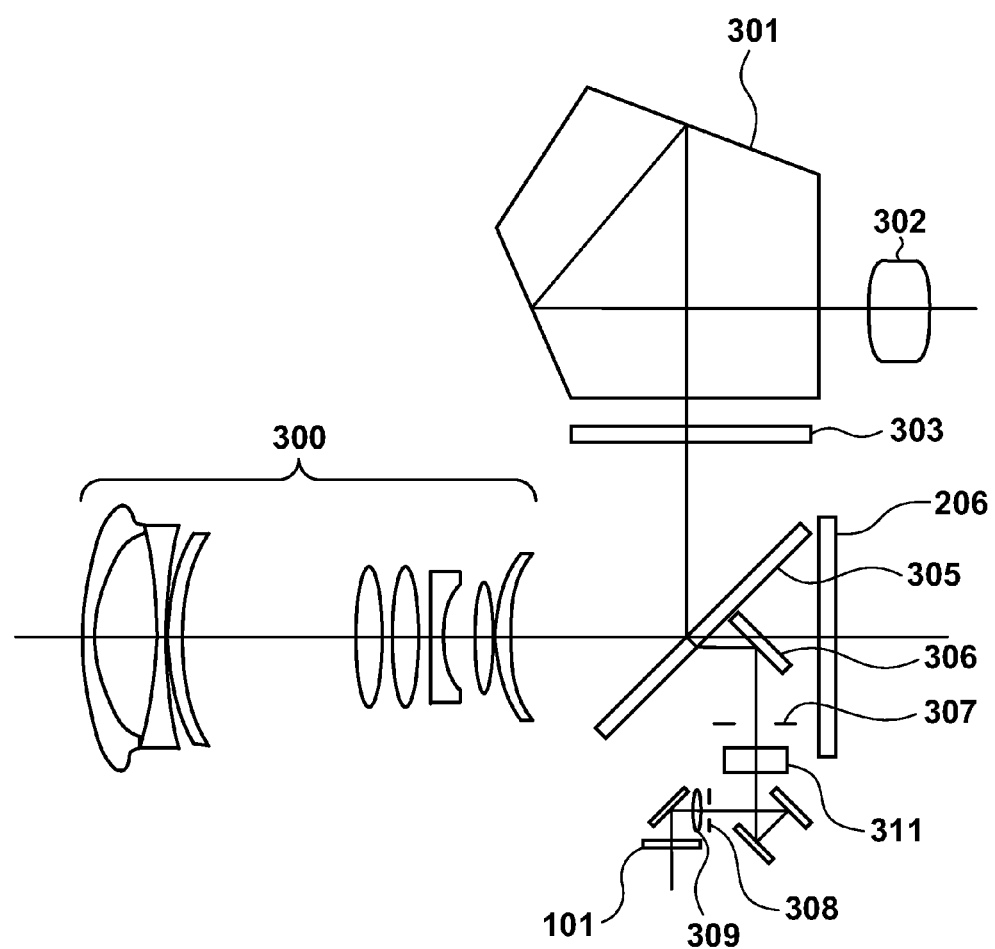
FIG. 2 is a view showing the optical arrangement of the camera according to the first embodiment of the present invention.

A focus detection method in a focus detection apparatus (including an optical system from the field mask 307 to the secondary imaging lens 309 and the AF sensor 101 in FIG. 2) of this embodiment is a known phase-difference detection method.

Details of the AF sensor 101 will be described below with reference to FIGS. 3 to 5.

Figure 3:
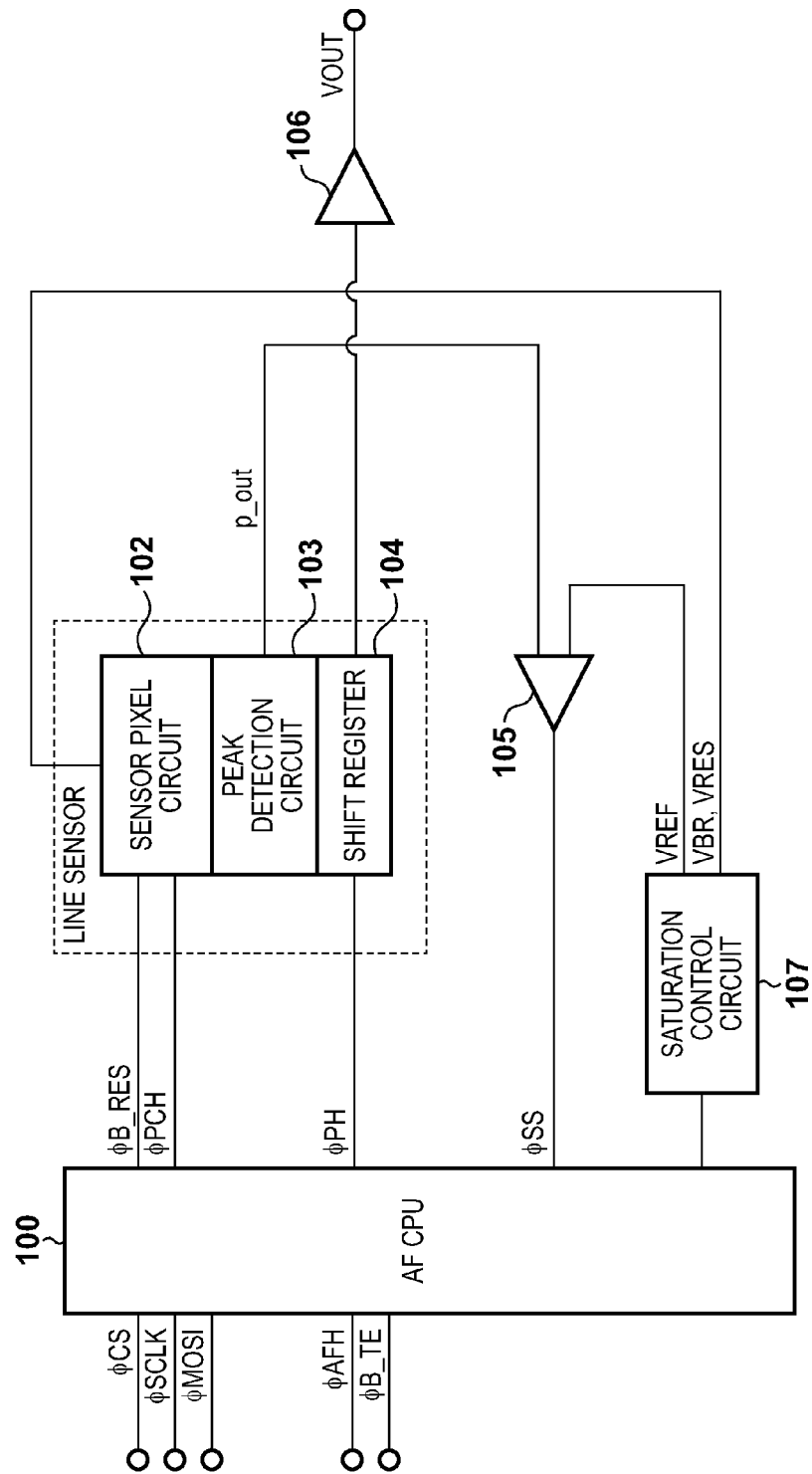
FIG. 3 is a block diagram showing the arrangement of an AF sensor according to the first embodiment of the present invention.

FIG. 3 is a block diagram of the AF sensor 101. Referring to FIG. 3, the AF sensor 101 includes an AF CPU 100, which controls an accumulation operation of a line sensor and a read-out operation of an image signal using signals φB_RES, φPCH, and φPH. The line sensor includes a plurality of photoelectric conversion pixels used for phase-difference detection, and detects first and second images from outputs of, for example, about 30 to 80 pixels.

The line sensor includes a sensor pixel circuit 102, peak detection circuit 103, and shift register 104. The sensor pixel circuit 102 corresponds to a circuit which accumulates photoelectrically converted signal charges for respective pixels, and temporarily stores accumulated signals.

The peak detection circuit 103 detects a largest signal POUT of those accumulated by the respective pixels. A peak comparator 105 compares the signal POUT detected by the peak detection circuit 103 and a voltage VREF (accumulation termination voltage), and controls a signal φSS from Lo to Hi when POUT≥VREF.

The shift register 104 selects pixels to be read out in turn from a signal of the first pixel in synchronism with the clock signal φPH from the AF CPU 100. An output amplifier 106 amplifies a pixel signal Sn (n-th pixel signal) selected by the shift register 104 by a predetermined gain, and outputs the amplified signal.

A saturation control circuit 107 is a circuit (a reset voltage generation circuit, a gate voltage generation circuit) required to generate the termination voltage VREF of the peak comparator 105, a reset voltage VRES of the sensor pixel circuit 102, and a gate OFF voltage VBR of a reset switch.

The AF CPU 100 includes an interface terminal with an external device (the camera CPU 200 in this case). The camera CPU 200 can control an accumulation start timing, pixel signal read-out timing, and saturation amount by communicating with the AF CPU 100 using input signals φCS, φSCLK, and φMOSI. Also, the camera CPU 200 can forcibly instruct to terminate accumulation even during an accumulation operation.

On the other hand, an output signal φAFH is a synch signal of a pixel output, which is output from Vout, and the pixel output is A/D-converted by an A/D converter (not shown) in the camera CPU 200 according to output timing of the signal φAFH. The AF CPU 100 controls a signal φB_TE to Hi during an accumulation operation, and controls the signal φB_TE to Lo while accumulation is terminated. The camera CPU 200 can judge whether or not an accumulation operation is in progress by monitoring the signal φB_TE.

Figure 4:
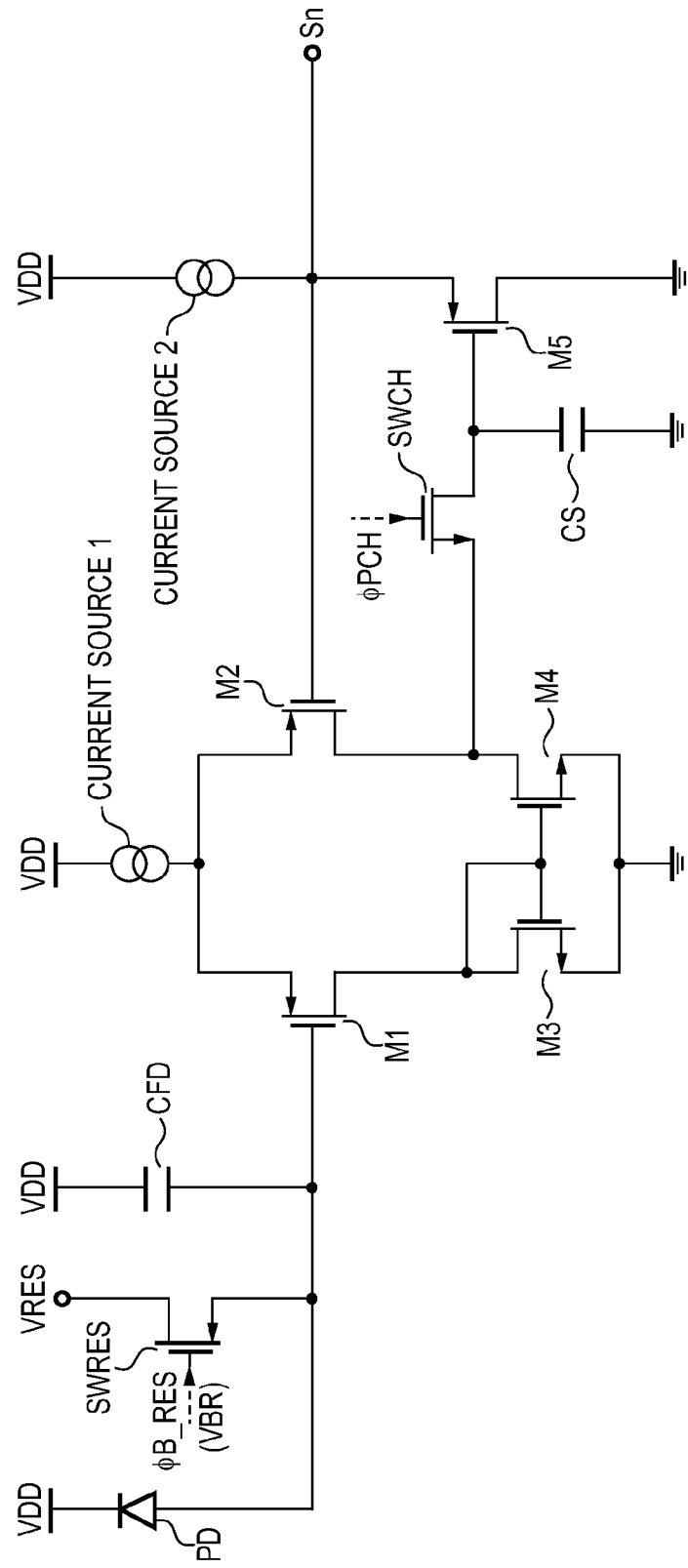
FIG. 4 is a circuit diagram showing a pixel circuit of the AF sensor according to the first embodiment of the present invention.
Figure 5:
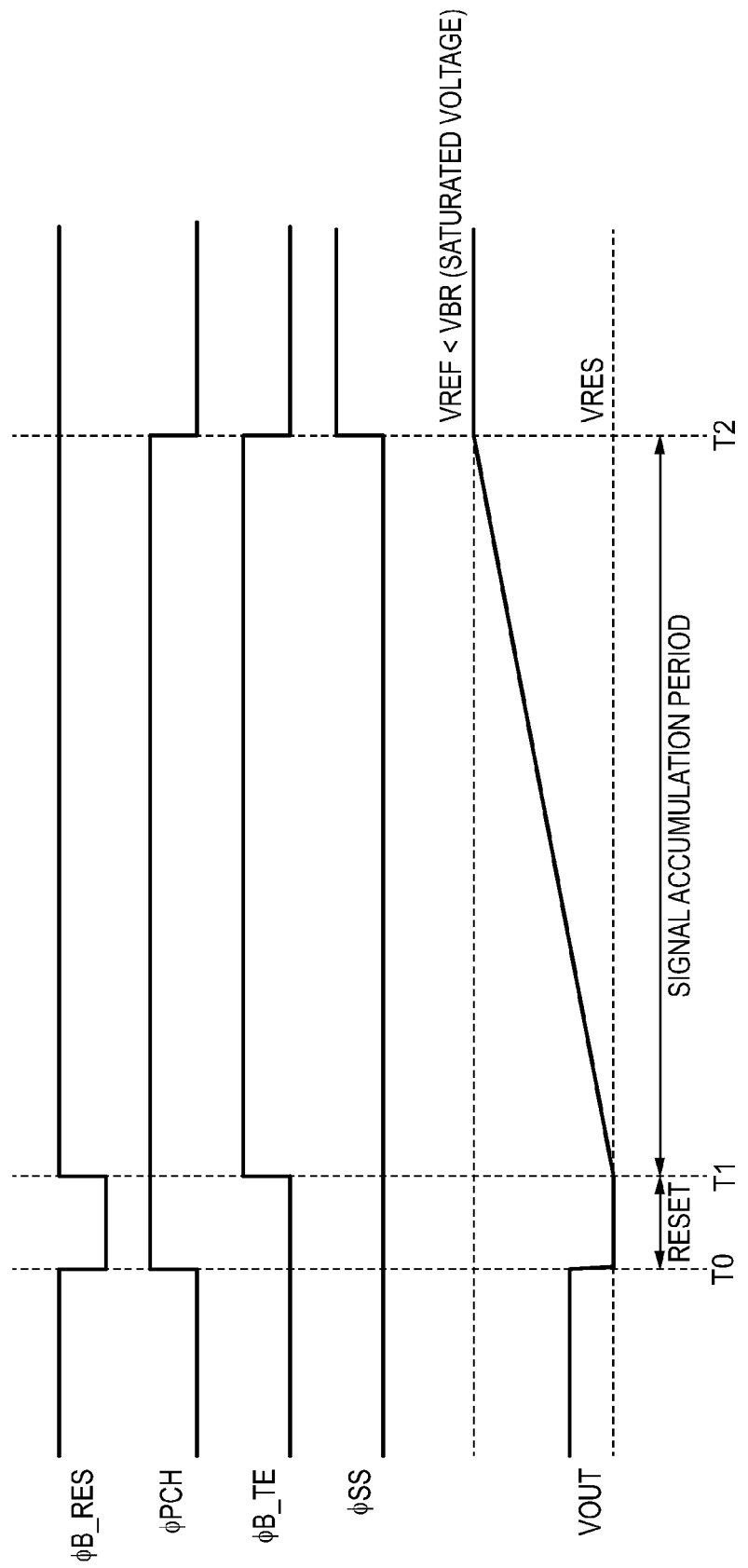
FIG. 5 is a timing chart showing the operation of the AF sensor according to the first embodiment of the present invention.

FIG. 4 is a detailed circuit diagram of the sensor pixel circuit 102. The sensor pixel circuit 102 includes a photodiode PD, capacitors CFD and CS, a current source 1, a current source 2, MOS transistors M1, M2, M3, M4, and M5, and switch MOS transistors SWRES and SWCH. The switch MOS transistor SWRES (overflow drain element) resets the photodiode and capacitor CFD to a reset voltage VRES when it is ON. On the other hand, the switch MOS transistor SWRES operates as an overflow drain switch when it is OFF, and prevents a potential of the photodiode PD (anode side) from exceeding a gate OFF voltage (voltage VBR) of that switch. The voltages VBR and VRES are generated by the saturation control circuit 107 and can control a saturated voltage and saturation amount. Assume that the saturated voltage=VBR, and the saturation amount=VBR−VRES.

In this example, two types of saturation amounts H and L can be set via a communication from the camera CPU 200. Assume that H>L for the saturation amount. The saturation control circuit 107 generates VBR_H for the saturation amount H, and generates VBR_L for the saturation amount L. Assume that VBR_H>VBR_L.

The switch MOS transistor SWCH is a switch required to store a pixel signal in the memory capacitor CS, and stores a pixel signal accumulated so far when it is OFF. The switch MOS transistors SWRES and SWCH are ON/OFF-controlled respectively by the signals φB_RES and φPCH. The capacitor CFD is a parasitic capacitance generated by the photodiode, MOS transistors, switches, wirings, and the like.

The operation of the above circuit will be described below with reference to the timing chart shown in FIG. 5.

Initially, the AF CPU 100 controls φB_RES to Lo and φPCH to Hi at time T0, thus turning on both the transistors SWRES and SWCH. During a T1 period from time T0, the AF CPU 100 resets the photodiode PD and capacitors CFD and CS. The AF CPU 100 controls φB_RES to Hi at time T1, thereby turning off the transistor SWRES. From this timing, a charge photo-electrically converted by the photodiode is accumulated by the capacitor CFD and is voltage-converted. The voltage-converted signal (signal voltage) is output from a pixel output Sn via a buffer amplifier including the transistors M1 to M4 and M5. During accumulation, the AF CPU 100 controls φB_TE to Hi.

Respective pixel outputs Sn are connected to the peak detection circuit 103 and shift register 104. The peak detection circuit 103 outputs a largest signal POUT of the respective pixel outputs Sn. The signal POUT grows from a level of the voltage VRES to have a tilt according to an object luminance BV (luminance information). In this example, at time T2, the voltage VOUT of the signal POUT reaches the voltage VREF. The signal φSS from the peak comparator 105 is controlled from Lo to Hi. The AF CPU 100 monitors the signal φSS and controls the signal φPCH to Lo when the signal φSS goes to Hi, thereby turning off the transistor SWCH, and storing a pixel signal in the capacitor CS. At the same time, the AF CPU 100 controls φB_TE to Lo.

Note that the voltage VREF is an accumulation termination determination level, and the saturation control circuit 107 sets the voltage VREF to be a voltage lower than the voltage VBR serving as the saturated voltage.

The focus adjustment operation in the camera according to the first embodiment will be described below with reference to the flowchart shown in FIG. 6.

Figure 6:
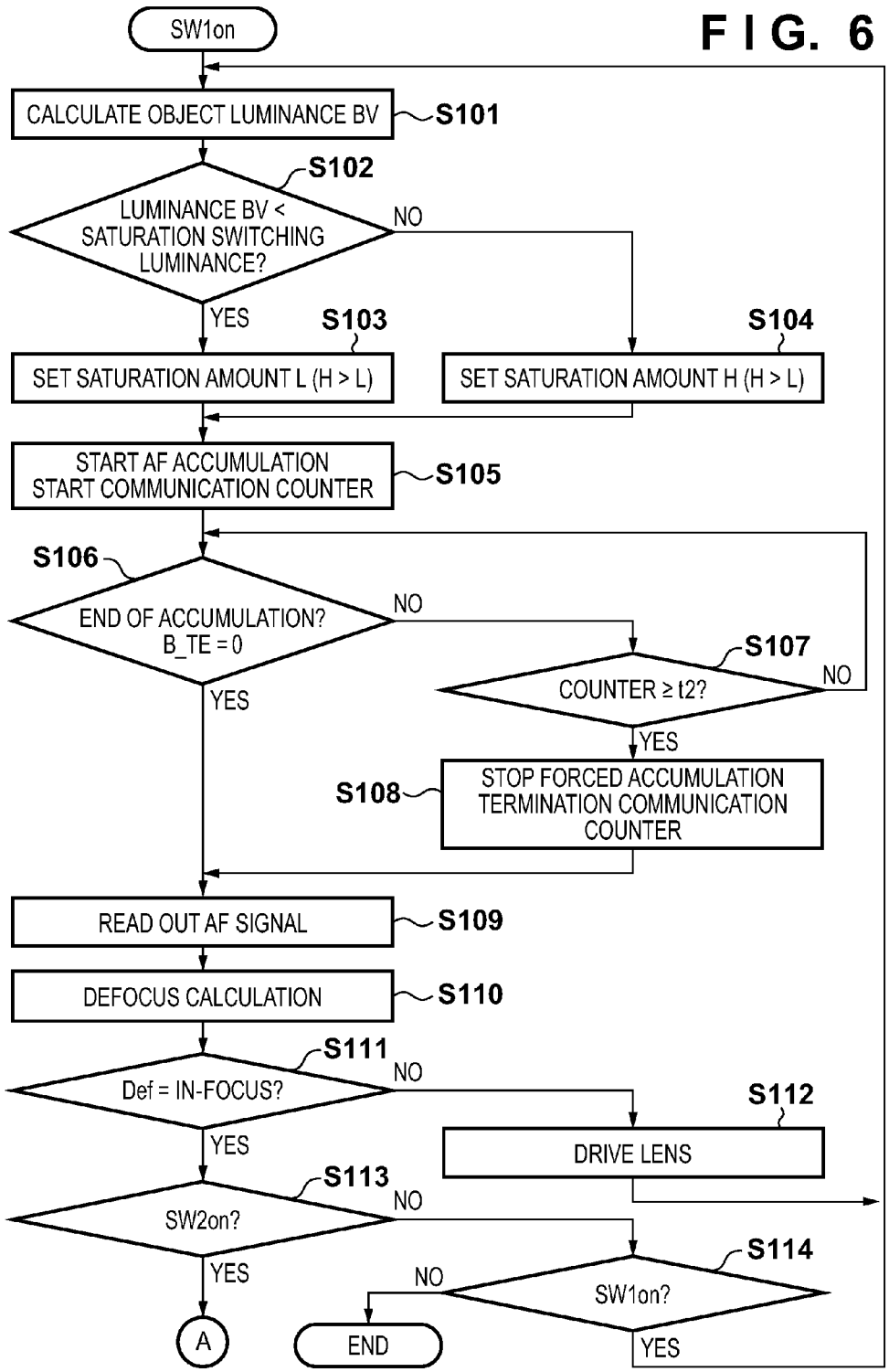
FIG. 6 is a flowchart showing a focus adjustment operation according to the first embodiment of the present invention.

FIG. 6 is a flowchart showing operations after the switch SW1 is pressed.

In step S101, the camera CPU 200 calculates an object luminance BV from the output from the AE sensor 207. The camera CPU 200 determines in step S102 whether or not the object luminance BV calculated in step S101 is lower than a saturation switching luminance. If the object luminance BV is lower than the saturation switching luminance, the camera CPU 200 sets the saturation amount of the AF sensor 101 to be L (second value) by communicating with the AF CPU 100 via the signals φCS, φSCLK, and φMOSI in step S103.

On the other hand, if the object luminance BV is not lower than the saturation switching luminance (not lower than a predetermined value), the camera CPU 200 sets the saturation amount of the AF sensor 101 to be H (first value, H>L) in step S104.

In step S105, the camera CPU 200 starts accumulation of the AF sensor 101 by communicating with the AF CPU 100 via the signals φCS, φSCLK, and φMOSI. The AF CPU 100 controls the saturation control circuit 107 to set various voltages according to the saturation amount set in step S103 or S104, thus starting an accumulation operation. Also, the camera CPU 200 resets the counter 210, and then starts a count-up operation.

In step S106, the camera CPU 200 determines an accumulation state of the AF sensor 101 by checking a status of the signal φB_TE. If φB_TE is Lo, the camera CPU 200 determines that the accumulation operation of the AF sensor 101 ends, and the process advances to step S109. On the other hand, if φB_TE is Hi, the camera CPU 200 determines that the accumulation operation of the AF sensor 101 continues, and the process advances to step S107.

The camera CPU 200 determines in step S107 whether or not the counter value is not less than t2. If the internal counter value is not less than t2, the camera CPU 200 forcibly terminates the accumulation operation of the AF sensor 101 by communicating with the AF CPU 100 via the signals φCS, φSCLK, and φMOSI in step S108. t2 is a forced termination period, and the accumulation operation of the AF sensor 101 in the dark state is forcibly terminated by a predetermined time period when the accumulation operation does not end based on the determination result of the peak comparator or so as to prevent AF performance from impairing due to object blurring during the accumulation operation. On the other hand, if the counter value is less than t2, the process returns to step S106 to check φB_TE again.

In step S109, the camera CPU 200 executes a read-out operation of pixel signals by communicating with the AF CPU 100 via the signals φCS, φSCLK, and φMOSI. In synchronism with an output signal φAHF from the AF sensor 101, pixel signals output from a VOUT terminal are A/D-converted.

In step S110, the camera CPU 200 as calculation means calculates a defocus amount by a correlation calculation as a known technique from the pixel signals from the AF sensor 101 obtained in step S109.

In step S111, the camera CPU 200 determines a focus state based on the defocus amount calculated in step S110. If this defocus amount falls within a desired range, for example, (¼)Fδ (F: an aperture value of the lens, δ: a constant=20 μm; therefore, 10 μm for a lens of F2.0), the camera CPU 200 determines an in-focus state, and the process advances to step S113.

On the other hand, if the defocus amount is larger than the desired range (for example, (¼)Fδ), the camera CPU 200 as a lens driving means instructs the lens communication circuit 204 to drive the lens by the defocus amount, which is calculated in step S110, in step S112. Then, the camera CPU 200 returns the process to step S101, and repeats the aforementioned operation until an in-focus state is determined.

In step S113, the camera CPU 200 detects a state of the switch SW2. If the switch SW2 is ON, the camera CPU 200 starts an imaging operation (A) from step S201. On the other hand, if the switch SW2 is OFF, the camera CPU 200 detects a state of the switch SW1 in step S114. If the switch SW1 is still ON in step S114, the camera CPU 200 repeats the processes from step S101; if the switch SW1 is OFF, it ends the AF operation.

Figure 7:
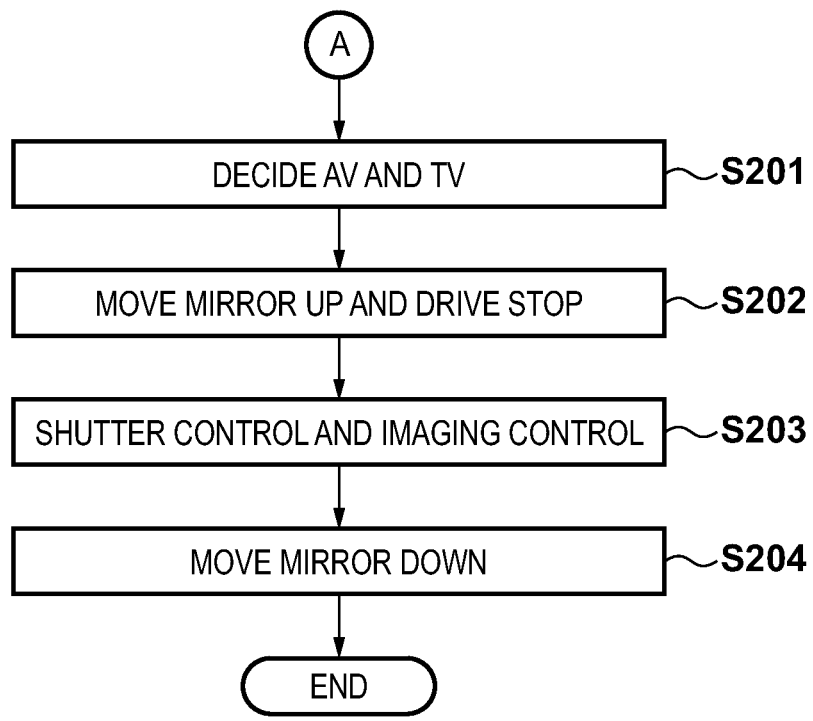
FIG. 7 is a flowchart showing an imaging operation according to the first embodiment of the present invention.

The imaging operation (A) from step S201 will be described below with reference to the flowchart shown in FIG. 7.

In step S201, the camera CPU 200 calculates an exposure value EV by adding the object luminance BV calculated in step S101 and a set ISO speed SV. Then, the camera CPU 200 decides an aperture value AV and shutter speed TV corresponding to the exposure value EV by a known method (for example, using a predetermined program diagram).

In step S202, the camera CPU 200 retracts the quick return mirror 305 from an imaging optical path, and instructs the imaging lens 300 via the lens communication circuit 204 to set the stop to have an aperture corresponding to the aperture value AV decided in step S301.

After that, after the quick return mirror 305 is completely retracted from the imaging optical path, the camera CPU 200 controls the shutter speed based on an energization period of the magnets 218a and 218b via the shutter control circuit 208 in step S203, thus exposing the imaging sensor 206.

In step S204, the camera CPU 200 returns the quick return mirror 305 to the position in the imaging optical path, thus ending the imaging operation.

The saturation amount setting operation in steps S102 to S104 in FIG. 6 will be described below.

FIG. 8A is a graph showing an accumulation signal POUT in a high luminance state. When an object has a high luminance, the saturation amount of the AF sensor 101 is set to be the saturation amount H. As the saturation amount H, a saturation amount as large as possible is set in consideration of a depletion voltage of the photodiode and a D range of the buffer amplifier including the transistors M1, M2, M3, M4, and M5. As the voltage VREF_H, a voltage lower than the voltage VBR_R by a predetermined amount is set. When the object luminance is sufficiently high, the signal POUT reaches the voltage VREF_H by a period t1 before the forced termination period t2.

On the other hand, FIG. 8B is a graph showing an accumulation signal POUT in a low luminance state. When an object has a low luminance, the accumulation period reaches the forced termination period t2 before the signal POUT reaches the voltage VREF_H. As a luminance is lower, since an obtained signal amount is decreased, a large saturation amount is not required. Hence, the saturation amount L is set to be lower than the saturation amount H, thus suppressing dark current noise and improving the SN. As the voltage VREF_L, a voltage lower than the voltage VBR_L by a predetermined amount is set. Note that an object luminance at which the signal POUT reaches the voltage VREF_L by the period t2 is measured in advance, and is stored as the saturation amount switching luminance.

As described above, the saturation control circuit 107 can control the saturation amount of the AF sensor 101 by changing the voltage VBR. Also, by switching the saturation amount according to the object luminance BV (steps S102 to S104), accumulation control can be executed to have the appropriate saturation amount, and dark current noise is suppressed in a low-luminance environment, thus attaining precise focus adjustment. Furthermore, since the voltage VREF is switched in correspondence with the saturation amount, the accumulation operation can be terminated before the set saturation amount is reached.

Note that the saturation amount is controlled by changing the voltage VBR in the first embodiment. Alternatively, the same effects can be obtained by changing the voltage VRES.

Second Embodiment

In the first embodiment, an object luminance BV is calculated from the output of an AE sensor 207, and the saturation amount of an AF sensor 101 is switched based on that BV value. By contrast, the second embodiment will explain a method of switching the saturation amount of the AF sensor 101 based on the output signal of the AF sensor 101. The arrangements of the camera and AF sensor are the same as those of the first embodiment, and a description thereof will not be repeated.

Figure 9:
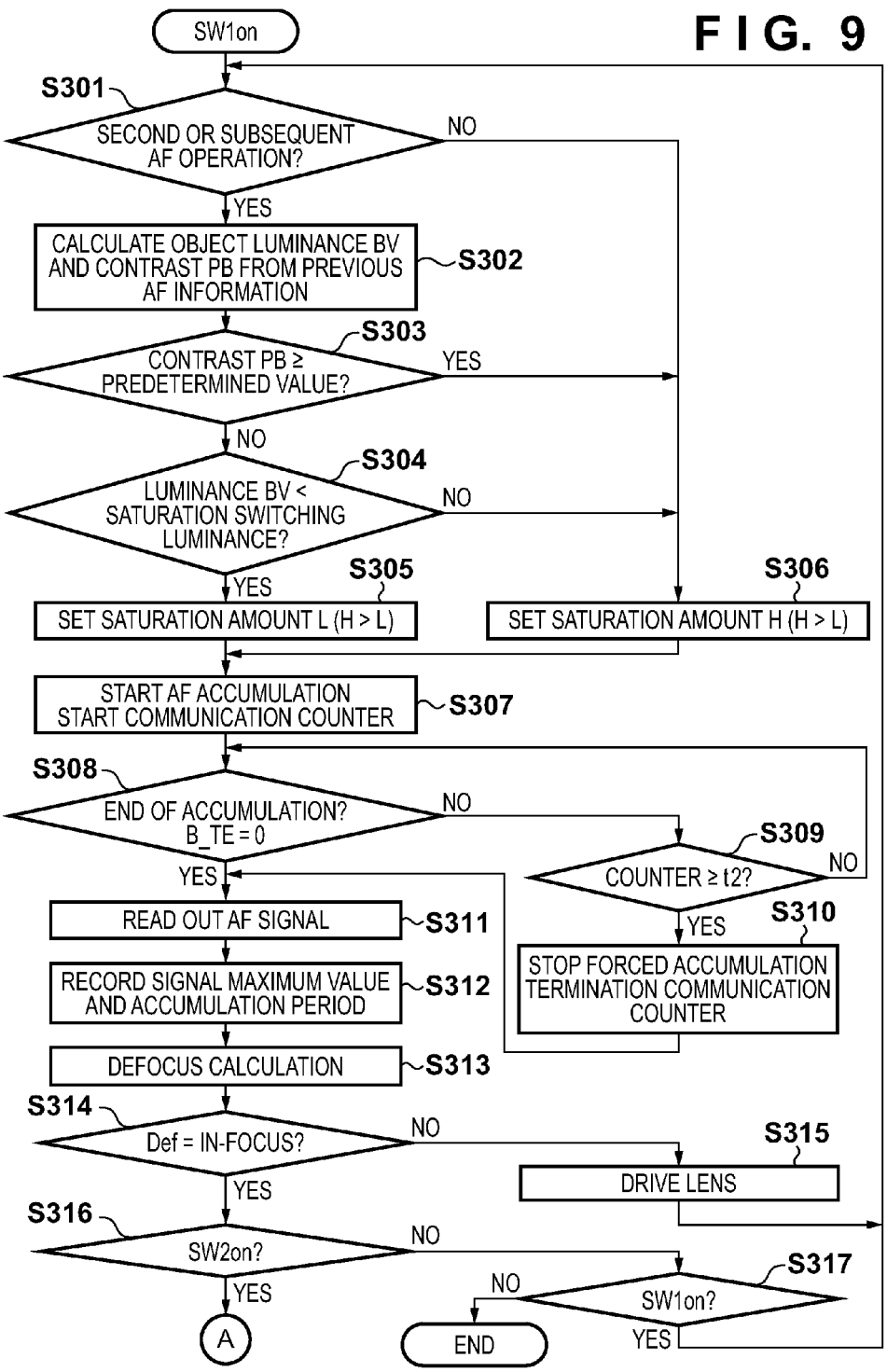
FIG. 9 is a flowchart showing a focus adjustment operation according to the second embodiment of the present invention.

The focus adjustment operation in the camera according to the second embodiment will be described below with reference to the flowchart shown in FIG. 9. FIG. 9 is a flowchart showing operations after a switch SW1 is pressed.

A camera CPU 200 determines in step S301 whether or not a second or subsequent AF operation is to be executed since the switch SW1 is pressed. In case of the second or subsequent AF operation, the process advances to step S302, and an object luminance BV is calculated using pixel signals stored in the camera CPU 200 and an accumulation period at that time. On the other hand, in case of the first AF operation, the process advances to step S306, and the camera CPU 200 sets the saturation amount of the AF sensor 101 to be H.

In step S302, the camera CPU 200 calculates an object luminance BV from previously stored information of the AF sensor 101. FIGS. 8A and 8B show signals POUT respectively in high and low luminance states. The signal POUT grows at a rate corresponding to the object luminance BV. Therefore, (signal POUT−voltage VRES)/accumulation period t corresponding to the luminance BV is measured and stored in advance. The object luminance BV is calculated from a previous maximum value (corresponding to POUT) of pixel signals from the AF sensor 101 and accumulation period t.

Furthermore, a contrast PB is calculated from the pixel signals. The contrast PB is a difference between a lowest voltage (signal BOUT) and highest voltage (signal POUT) of the pixel signals.

In step S303, the camera CPU 200 determines the contrast PB calculated in step S302. If PB≥PB1 (predetermined value), the camera CPU 200 judges that an object contrast is sufficiently large, and the influence of dark current noise is small, and the process advances to step S306 to set the saturation amount of the AF sensor 101 to be H. PB determination will be described below with reference to FIGS. 10A and 10B.

Figure 10A:
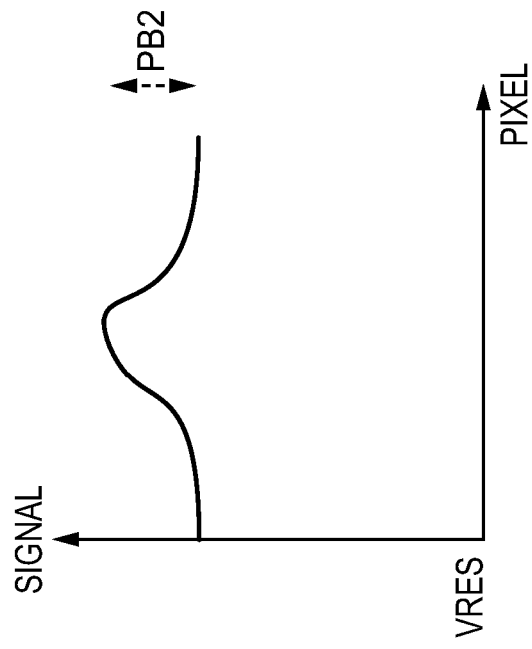
FIGS. 10A and 10B are graphs showing an object contrast.

FIG. 10A shows pixel signals when the object contrast is high. The contrast PB is a difference between the lowest voltage (signal BOUT) and highest voltage (signal POUT) of the pixel signals, and in this example, PB1 is set as the contrast PB. On the other hand, FIG. 10B shows pixel signals when the object contrast is low, and PB2 is set as the contrast PB.

Figure 10B:
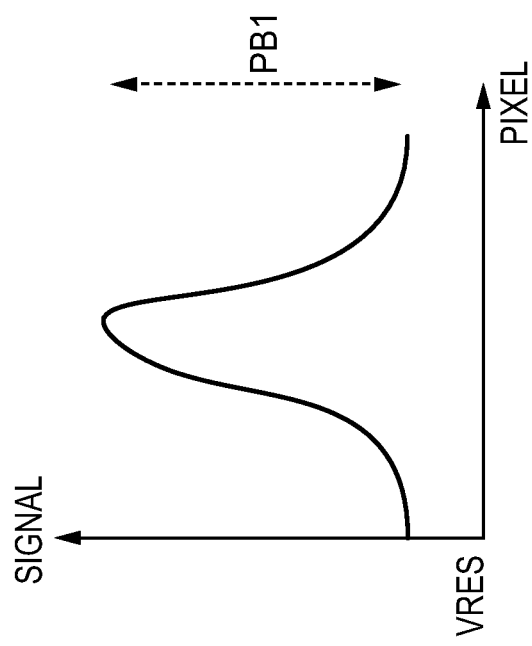

Since the signals POUT in FIGS. 10A and 10B are the same, the object luminance BV is also the same, but since PB1>PB2, PB1 is more insusceptible to the influence of noise such as a dark current upon calculation of a defocus amount by a correlation calculation.

On the other hand, if PB is smaller than the predetermined value (PB1), the process advances to saturation amount switching determination using the object luminance BV in step S304 and subsequent steps.

In step S304, the camera CPU 200 determines the object luminance BV calculated in step S302. If the object luminance BV is lower than a saturation switching luminance, the camera CPU 200 sets the saturation amount of the AF sensor 101 to be L by communicating with an AF CPU 100 via signals φCS, φSCLK, and φMOSI in step S305. On the other hand, if the luminance BV is not less than the saturation switching luminance, the camera CPU 200 sets the saturation amount of the AF sensor 101 to be H (H>L) in step S306.

In step S307, the camera CPU 200 starts accumulation of the AF sensor 101 by communicating with the AF CPU 100 via the signals φCS, φSCLK, and φMOSI. The AF CPU 100 controls a saturation control circuit 107 to set various voltages according to the saturation amount set in step S305 or S306, and starts an accumulation operation. The camera CPU 200 resets a counter 210, and then starts a count-up operation.

In step S308, the camera CPU 200 determines an accumulation state of the AF sensor 101 by checking a status of a signal φB_TE. If φB_TE is Lo, the camera CPU 200 determines that the accumulation operation of the AF sensor 101 ends, and the process advances to step S311. On the other hand, if φB_TE is Hi, the camera CPU 200 determines that the accumulation operation of the AF sensor 101 continues, and the process advances to step S309.

The camera CPU 200 determines in step S309 whether or not the counter value is not less than t2. If the counter value is not less than t2, the camera CPU 200 forcibly terminates the accumulation operation of the AF sensor 101 by communicating with the AF CPU 100 via the signals φCS, φSCLK, and φMOSI in step S310. Furthermore, the camera CPU 200 terminates the counter 210. On the other hand, if the counter value is less than t2, the process returns to step S308 to check φB_TE again.

In step S311, the camera CPU 200 executes a read-out operation of pixel signals by communicating with the AF CPU 100 via the signals φCS, φSCLK, and φMOSI. In synchronism with an output signal φAHF from the AF sensor 101, pixel signals output from a VOUT terminal are A/D-converted.

In step S312, the camera CPU 200 stores the pixel signals read out in step S310 and the accumulation period measured by the counter.

In step S313, the camera CPU 200 as a calculation means calculates a defocus amount by a correlation calculation as a known technique from the pixel signals from the AF sensor 101 obtained in step S311.

In step S314, the camera CPU 200 determines a focus state based on the defocus amount calculated in step S313. If this defocus amount falls within a desired range, for example, (¼)Fδ, the camera CPU 200 determines an in-focus state, and the process advances to step S316.

On the other hand, if the defocus amount is larger than the desired range (for example, (¼)Fδ), the camera CPU 200 as a lens driving means instructs a lens communication circuit 204 to drive the lens by the defocus amount, which is calculated in step S313, in step S315. Then, the camera CPU 200 returns the process to step S301, and repeats the aforementioned operation until an in-focus state is determined.

In step S316, the camera CPU 200 detects a state of a switch SW2. If the switch SW2 is ON, the camera CPU 200 starts an imaging operation from step S201. On the other hand, if the switch SW2 is OFF, the camera CPU 200 detects a state of the switch SW1 in step S317. If the switch SW1 is still ON in step S317, the camera CPU 200 repeats the processes from step S301; if the switch SW1 is OFF, it ends the AF operation.

The imaging operation from step S201 is the same as that in the first embodiment, and a description thereof will not be repeated.

As described above, according to the second embodiment, since the saturation amount is set based on information from the AF sensor 101, a more precise saturation amount can be set.

Third Embodiment

The third embodiment includes an AF sensor 301 obtained by adding a sensitivity switching function to the AF sensor 101 of the first embodiment.

Figure 11:
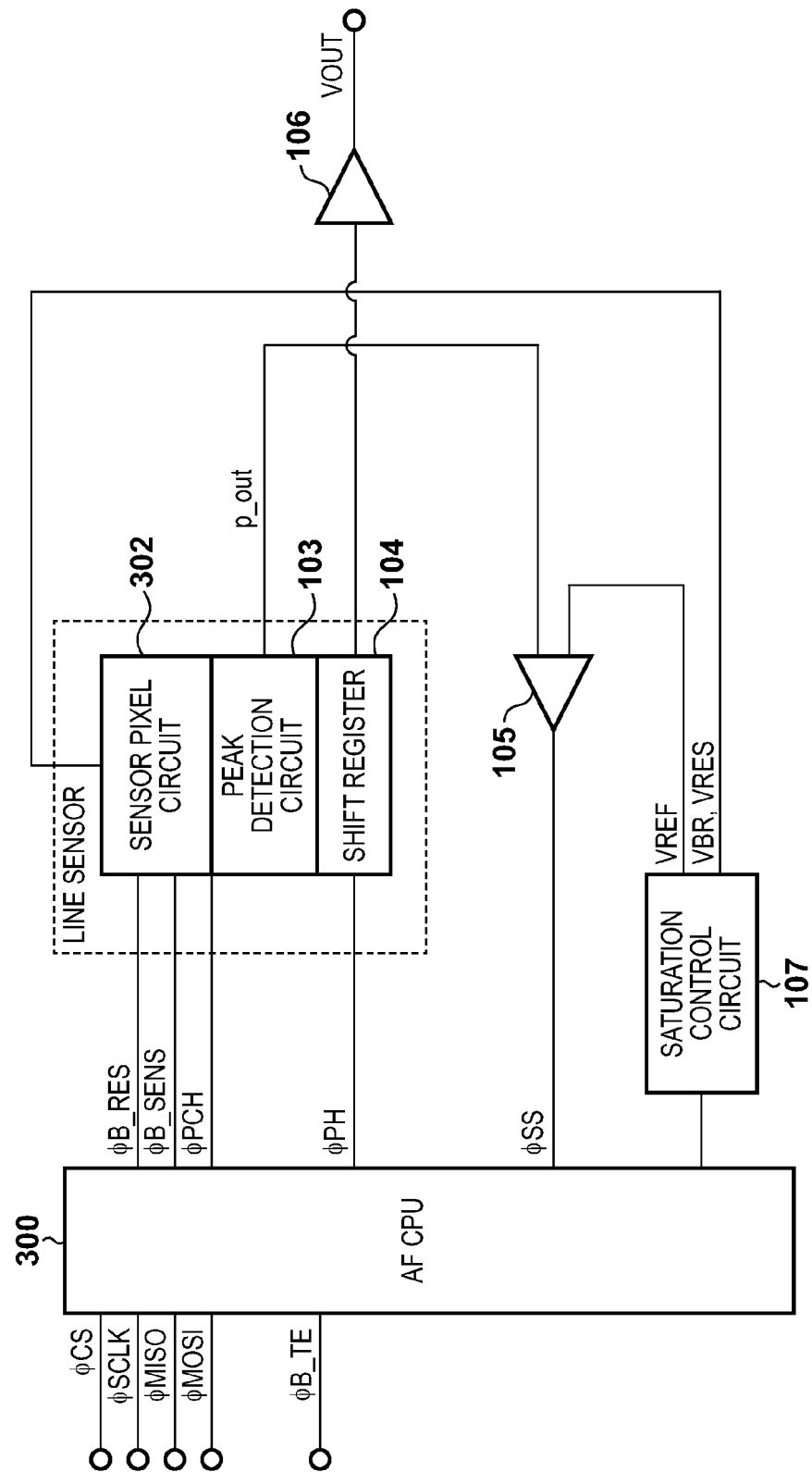
FIG. 11 is a block diagram showing the arrangement of an AF sensor according to the third embodiment of the present invention.

FIG. 11 is a block diagram of the AF sensor 301. The AF sensor 301 includes an AF CPU 300, which controls a sensitivity and accumulation operation of a line sensor, and a read-out operation of an image signal. A sensor pixel circuit 302 corresponds to a circuit which has a sensitivity switching function, accumulates photo-electrically converted signal charges for respective pixels, and temporarily stores accumulated signals. Other units are the same as those in FIG. 3.

Figure 12:
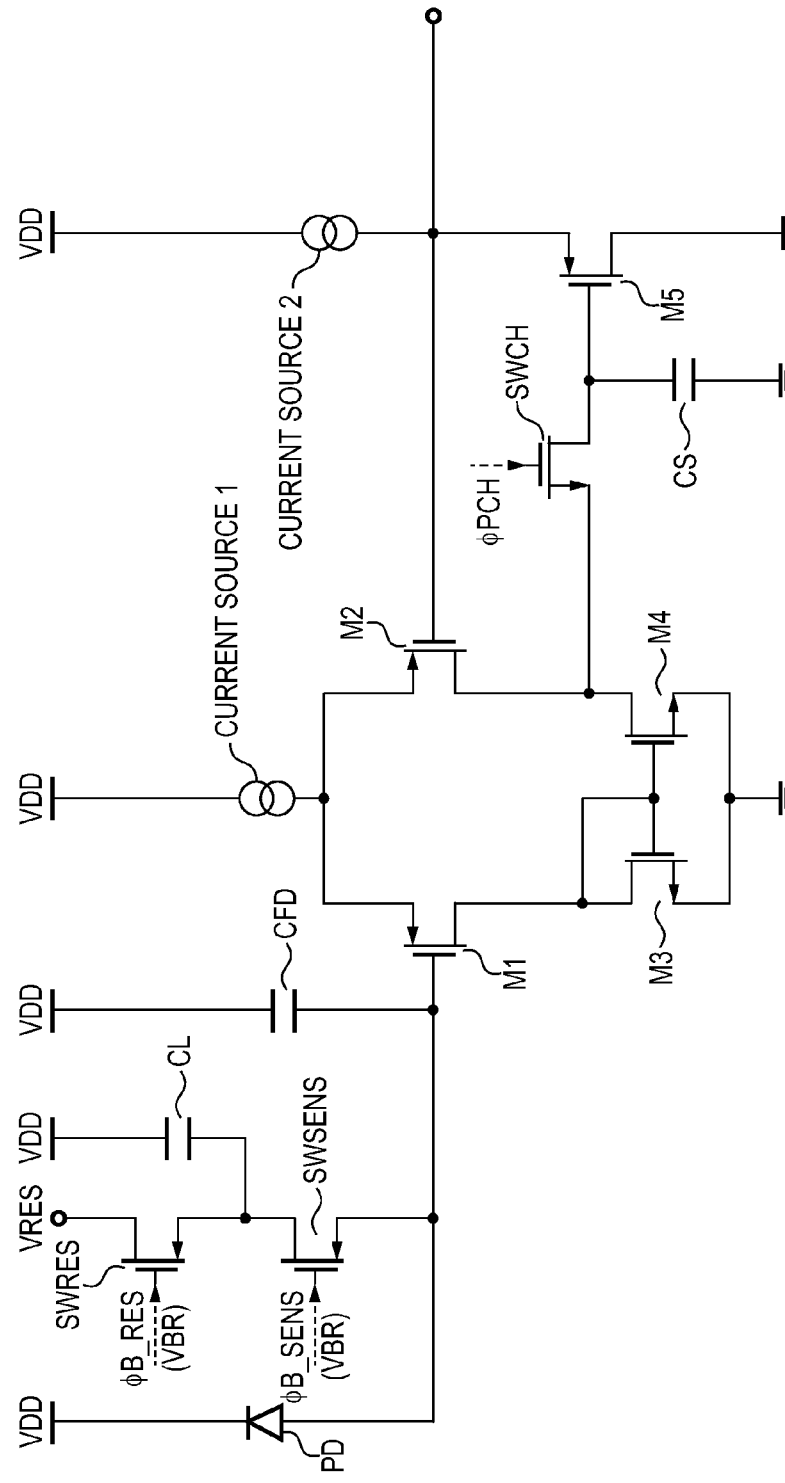
FIG. 12 is a circuit diagram showing a pixel circuit of the AF sensor according to the third embodiment of the present invention.

FIG. 12 is a detailed circuit diagram of the sensor pixel circuit 302. In FIG. 12, a low-sensitivity capacitor CL and a switch MOS transistor SWSENS as a sensitivity switching switch which selects that capacitor CL are added to the sensor pixel circuit 102 shown in FIG. 4. When the sensitivity is high, the switching MOS transistor SWSENS is turned off to operate as an overflow drain switch, and is controlled to prevent a potential of a photodiode PD from exceeding a gate OFF voltage (voltage VBR).

The operation of the circuit will be described below with reference to the timing charts shown in FIGS. 13A and 13B.

Figure 13A:
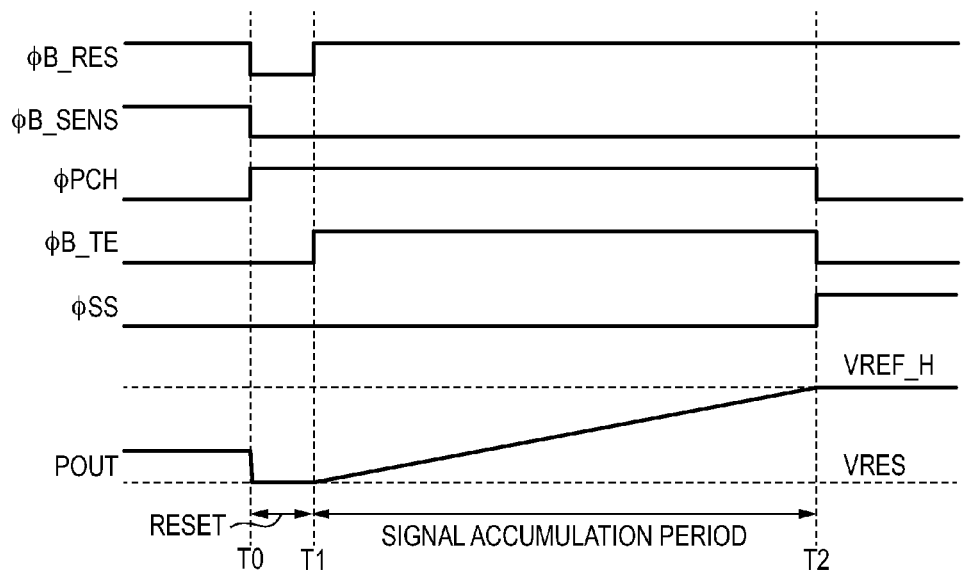
FIGS. 13A and 13B are timing charts showing the operation of the AF sensor according to the third embodiment of the present invention.

FIG. 13A shows an operation in a low-sensitivity mode. The AF CPU 300 controls φB_RES and φB_SENS to Lo and φPCH to Hi at time T0, thereby turning on all of a transistor SWRES, the transistor SWSENS, and a transistor SWCH. During a T1 period from time T0, the AF CPU 300 resets the photodiode PD, a capacitor CFD, the capacitor CL, and a capacitor CS. The AF CPU 300 controls φB_RES to Hi at time T1, thereby turning off the transistor SWRES. From this timing, a charge photo-electrically converted by the photodiode is integrated by the capacitor CFD and the capacitor CL connected parallel to the capacitor CFD and is voltage-converted. The voltage-converted signal is output from a pixel output Sn via a buffer amplifier including transistors M1 to M4 and M5. During accumulation, the AF CPU 300 controls φB_TE to Hi.

Respective pixel outputs Sn are connected to a peak detection circuit 103 and shift register 104. The peak detection circuit 103 outputs a largest signal POUT of the respective pixel outputs Sn. The signal POUT grows from a level of a voltage VRES to have a tilt according to an object luminance. When the signal POUT reaches the voltage VREF at time T2, a signal φSS from a peak comparator 105 is controlled from Lo to Hi. The AF CPU 300 monitors the signal φSS and controls the signal φPCH to Lo when the signal φSS goes to Hi, so as to turn off the transistor SWCH, thereby storing a pixel signal in the capacitor CS. At the same time, the AF CPU 300 controls φB_TE to Lo. In the low-sensitivity mode, assume that a saturation amount H is used, and the same voltage settings as in FIG. 8A are made.

Figure 13B:
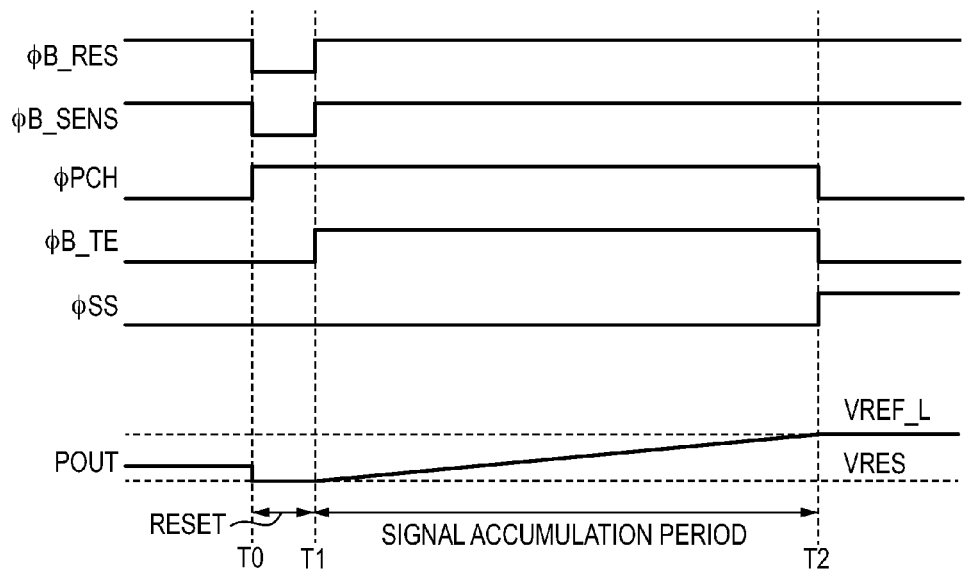

On the other hand, FIG. 13B shows an operation in a high-sensitivity mode. The AF CPU 300 controls φB_RES and φB_SENS to Lo and φPCH to Hi at time T0, thereby turning on all of transistors SWRES, SWSENS, and SWCH. During a T1 period from time T0, the AF CPU 300 resets the photodiode PD and the capacitors CFD, CL, and CS. The AF CPU 300 controls φB_RES and φB_SENS to Hi at time T1, thereby turning off the transistors SWRES and SWSENS. From this timing, a charge photo-electrically converted by the photodiode is accumulated by only the capacitor CFD and is voltage-converted. When the sensitivity is high, since an integration capacitance is small, a charge conversion coefficient becomes large. FIG. 13B shows a case in which a luminance is sufficiently lower than FIG. 13A, and the signal POUT grows to have a tilt smaller than the low-sensitivity mode. When the signal POUT reaches a voltage VREF_L at time T2, the signal φSS from the peak comparator 105 is controlled from Lo to Hi. The AF CPU 300 monitors the signal φSS, and controls the signal φPCH to Lo when the signal φSS goes Hi, thereby turning off the transistor SWCH and storing a pixel signal in the capacitor CS. At the same time, the AF CPU 300 controls φB_TE to Lo. In the high-sensitivity mode, assume that a saturation amount L is used, and the same voltage settings as in FIG. 8B are made.

Assume that the sensitivity is switched based on settings of a switch group 214 (FIG. 1) by a photographer. In an imaging operation under a bright site such as the outdoors, the photographer sets the low-sensitivity mode. On the other hand, in an imaging operation under a low-luminance environment such as the interior of a room or nighttime, the photographer sets the high-sensitivity mode.

A focus adjustment operation in the camera according to the third embodiment will be described below with reference to the flowchart shown in FIG. 14.

Figure 14:
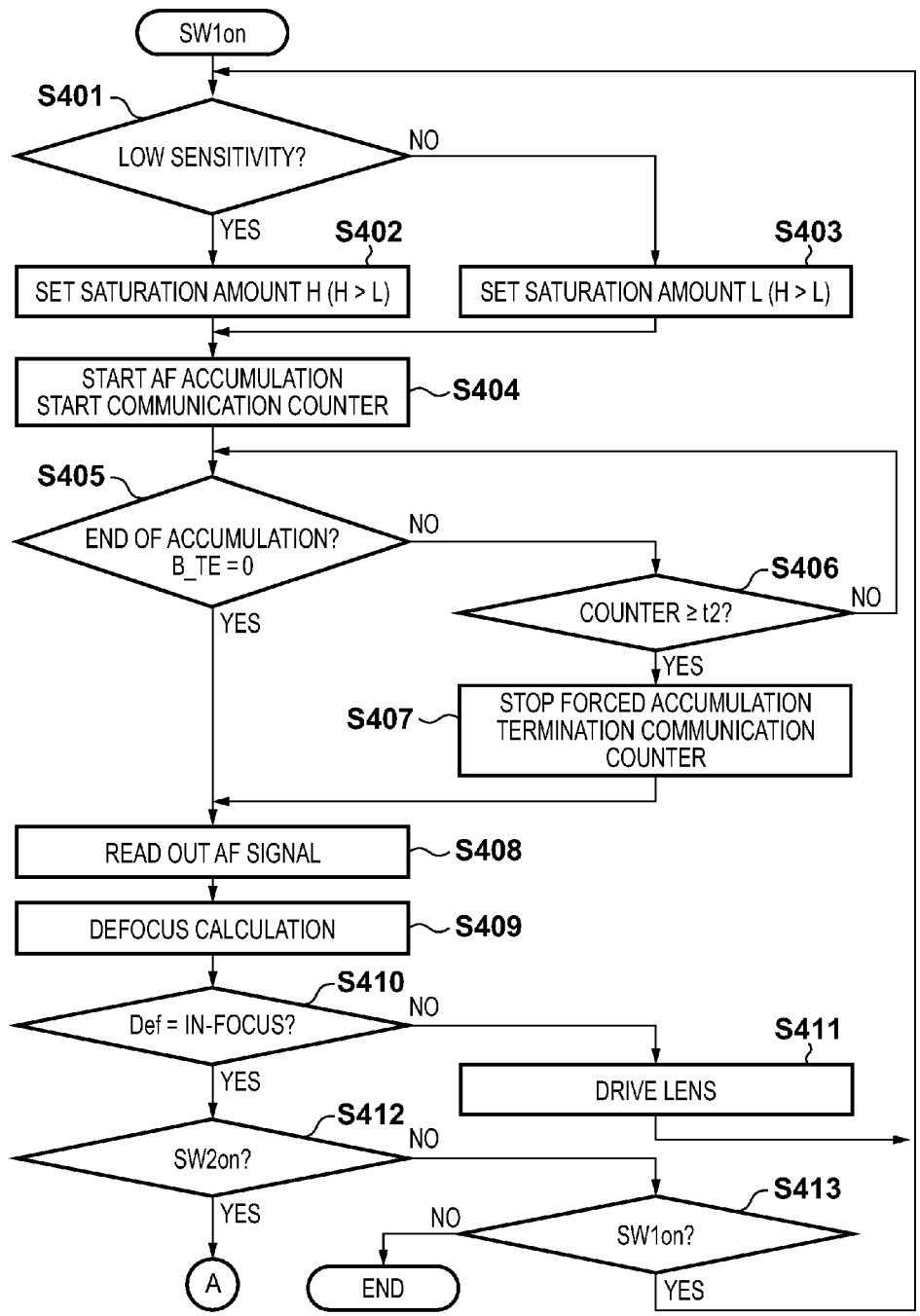
FIG. 14 is a flowchart showing a focus adjustment operation according to the third embodiment of the present invention.

FIG. 14 is a flowchart showing operations after a switch SW1 is pressed.

In step S401, a camera CPU 200 determines the sensitivity mode by detecting settings of the switch group 214. In case of the low-sensitivity mode, the camera CPU 200 sets the saturation amount of the AF sensor 301 to be H by communicating with the AF CPU 300 via signals φCS, φSCLK, and φMOSI in step S402.

On the other hand, in case of the high-sensitivity mode, the camera CPU 200 sets the saturation amount of the AF sensor 301 to be L (H>L) in step S403. The voltages VBR and VREF for the saturation amounts H and L are set in the same manner as in the first embodiment. Operations in steps S404 to S413 are the same as those in FIG. 6 of the first embodiment.

As described above, according to this embodiment, the saturation amount is switched according to the set sensitivity (steps S401 to S403). Even in an imaging operation in a low-luminance environment, since dark current noise can be suppressed, precise focus adjustment can be attained. As a means for switching the sensitivity of the AF sensor 300, a gain of an output amplifier 106 may be changed to obtain the same effects.

Fourth Embodiment

The fourth embodiment includes an AF sensor 401 which controls a saturation amount to follow a signal POUT.

Figure 15:
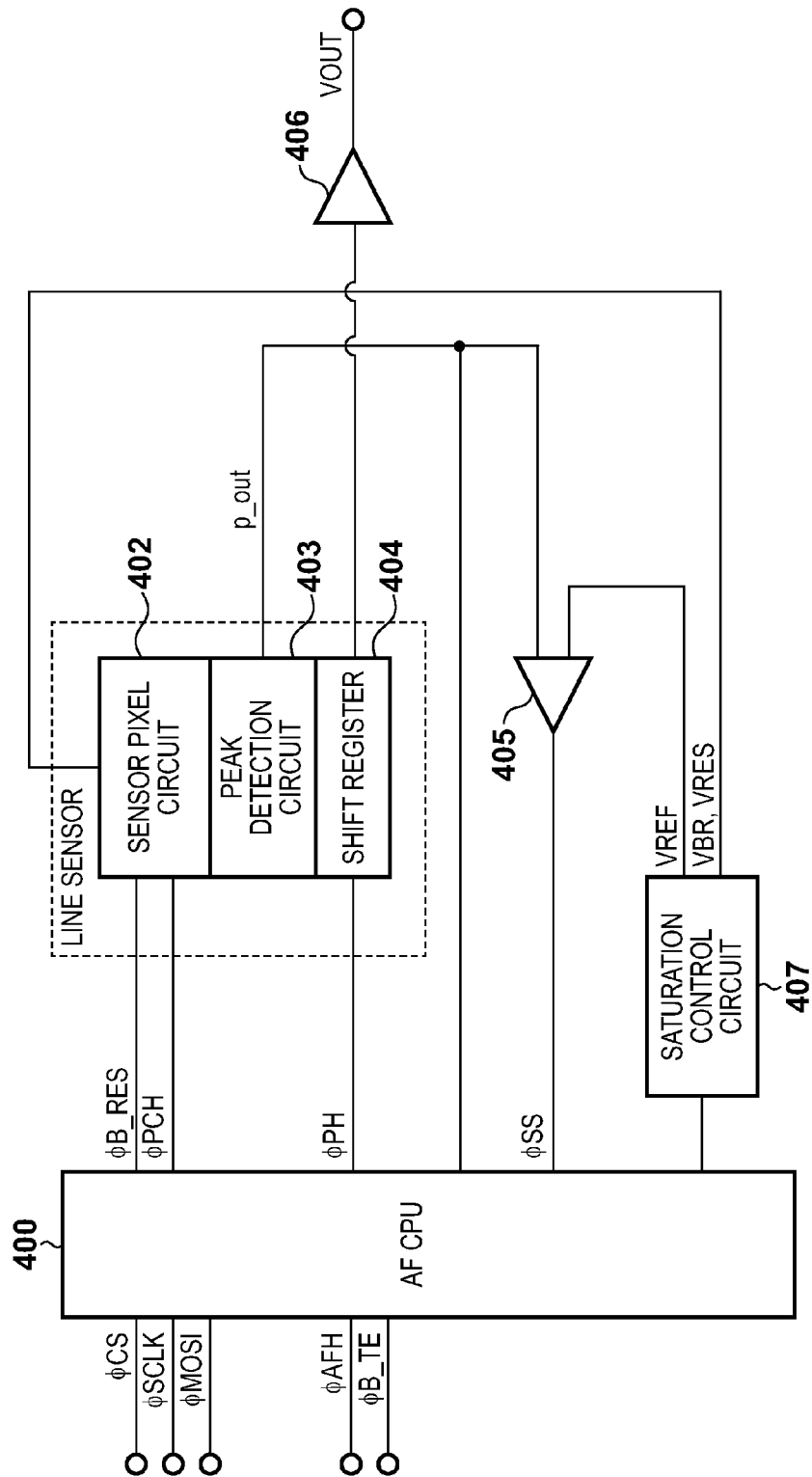
FIG. 15 is a block diagram showing a pixel circuit of an AF sensor according to the fourth embodiment of the present invention.

FIG. 15 is a block diagram of the AF sensor 401. Referring to FIG. 15, the AF sensor 401 includes an AF CPU 400, which controls an accumulation operation and image signal read-out operation of a line sensor using signals φB_RES, φPCH, and φPH.

The line sensor includes a sensor pixel circuit 402, peak detection circuit 403, and shift register 404. The sensor pixel circuit 402 corresponds to a circuit, which accumulates photo-electrically converted signal charges for respective pixels, and temporarily stores the accumulated signals.

The peak detection circuit 403 detects a largest value POUT of the signals accumulated by respective pixels, and outputs the signal POUT to the AF CPU 400 and a peak comparator 405. The peak comparator 405 compares the signal POUT detected by the peak detection circuit 403 and a voltage VREF (accumulation termination voltage), and controls a signal φSS from Lo to Hi when POUT≥VREF.

The shift register 404 selects pixels to be read out in turn from a signal of the first pixel in synchronism with the clock signal φPH from the AF CPU 400. An output amplifier 406 amplifies a pixel signal Sn (n-th pixel signal) selected by the shift register 404 by a predetermined gain, and outputs the amplified signal. A saturation control circuit 407 is a circuit required to generate the comparison voltage VREF of the peak comparator 405, a reset voltage VRES of the sensor pixel circuit 402, and a gate OFF voltage VBR of a resets switch.

The voltages VBR and POUT will be described below with reference to FIG. 16. In FIG. 16, the signal POUT grows from the voltage VRES at a rate corresponding to an object luminance BV. The AF CPU 400 controls the saturation control circuit 407 to generate the voltage VBR by offsetting the signal POUT by a predetermined margin amount. That is, the voltage VBR has the same tilt as that of the signal POUT from a voltage VBR_S. The signal POUT reaches a voltage VREF_H at t3, and an accumulation operation is terminated. After that, the voltage VBR assumes a maximum value at a voltage VBR_H.

As described above, the voltage VBR follows the signal POUT, thus setting an optimal saturation amount for every luminance.

Fifth Embodiment

The fifth embodiment will explain an operation of an imaging sensor 206 as a solid-state image sensor of an imager type having a two-dimensional array.

Figure 17:
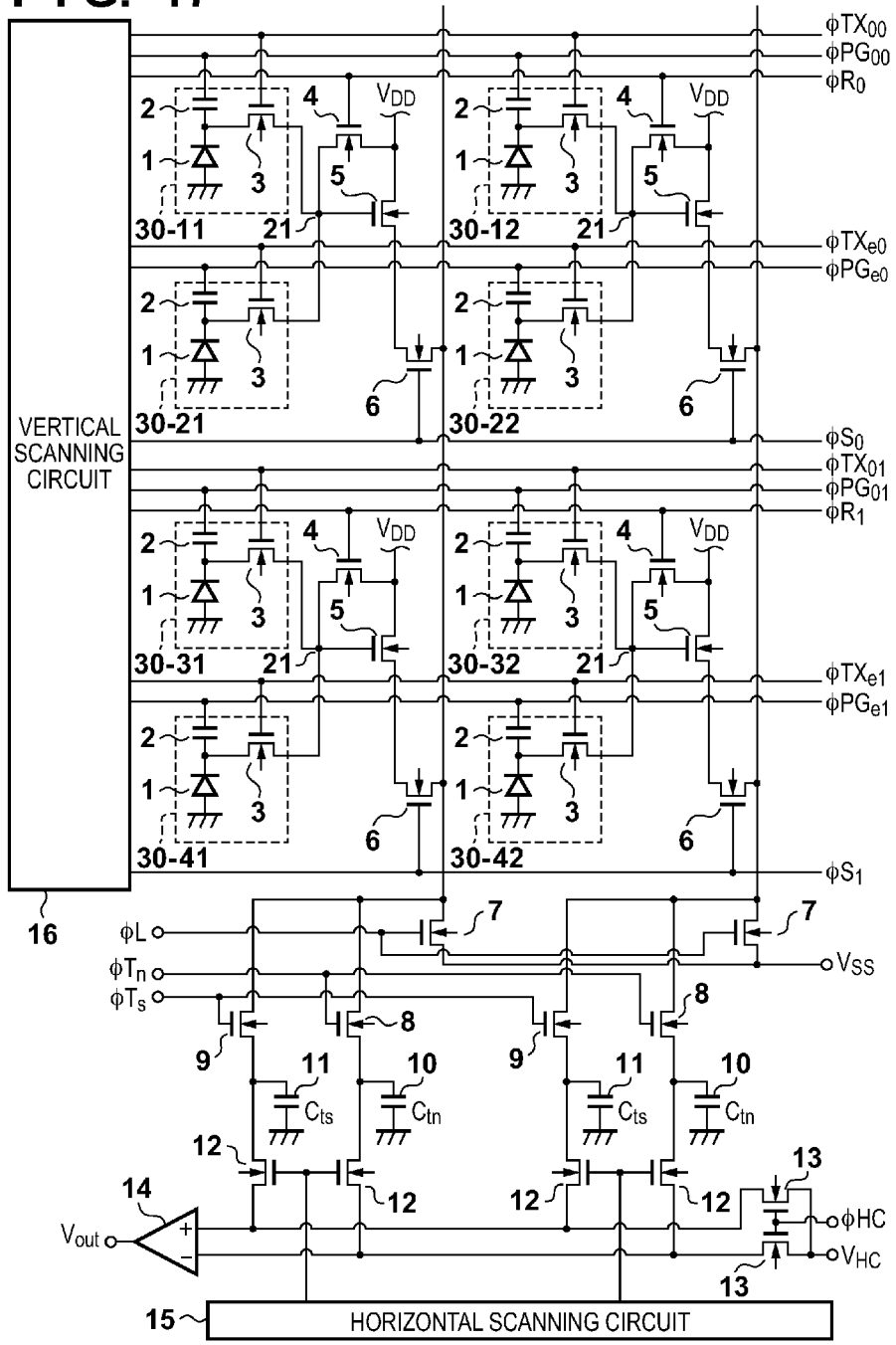
FIG. 17 is a circuit diagram of an area sensor according to the fifth embodiment of the present invention.

FIG. 17 is a schematic circuit diagram of the imaging sensor 206 according to the fifth embodiment, and this imaging sensor 206 is manufactured using a technique disclosed in, for example, Japanese Patent Laid-Open No. 09-046596. FIG. 17 shows a pixel range of 2 columns×4 rows of a two-dimensional C-MOS area sensor. When this sensor is used as an imaging element, a large number of pixels shown in FIG. 17 are laid out to allow acquisition of a high-resolution image.

Referring to FIG. 17, reference numeral 1 denotes a photo-electric conversion unit of a photo-electric conversion element including a MOS transistor and a depletion layer under the gate; 2, a photo gate; 3, a transfer switch MOS transistor; 4, a reset MOS transistor; and 5, a source-follower amplifier MOS transistor. Also, reference numeral 6 denotes a horizontal selection switch MOS transistor; 7, a source-follower load MOS transistor; 8, a dark output transfer MOS transistor; and 9, a bright output transfer MOS transistor. Furthermore, reference numeral 10 denotes a dark output accumulation capacitor $C_{TN}$; 11, a bright output accumulation capacitor $C_{TS}$; 12, a horizontal transfer MOS transistor; 13, a horizontal output line reset MOS transistor; 14, a differential output amplifier; 15, a horizontal scanning circuit; and 16, a vertical scanning circuit.

Figure 18:
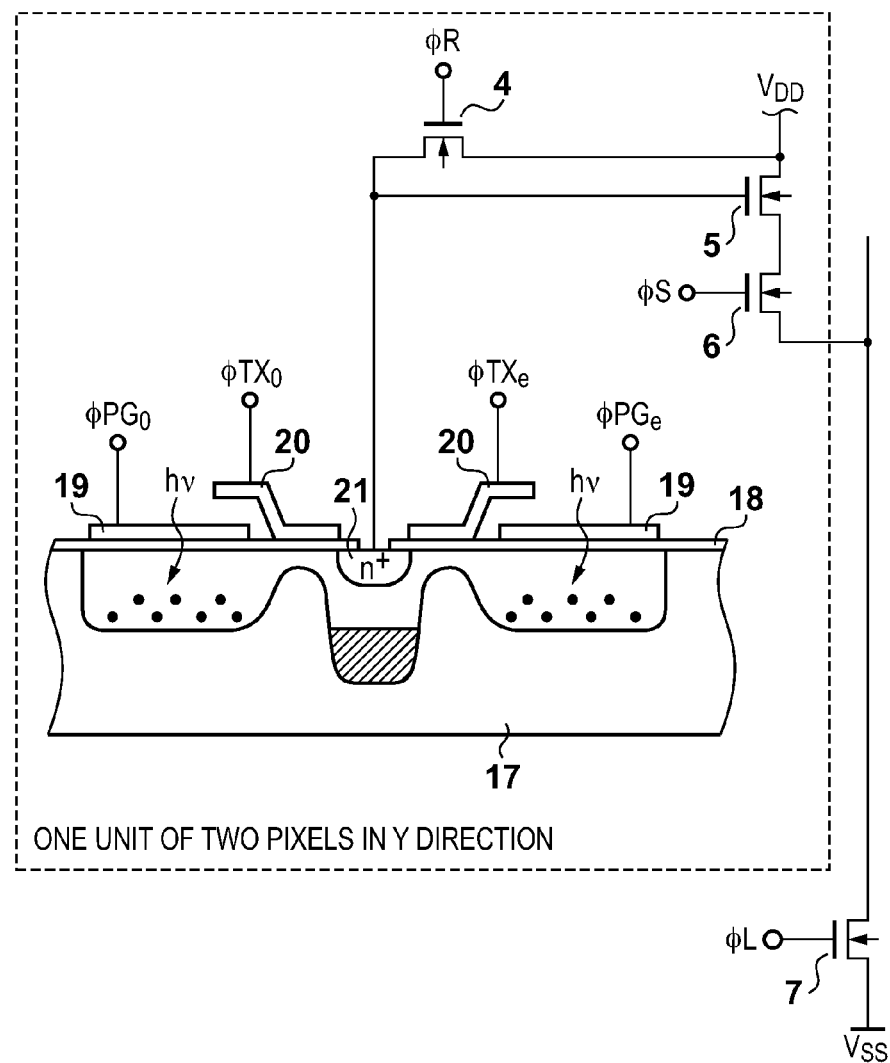
FIG. 18 is a view showing a pixel unit according to the fifth embodiment of the present invention.

FIG. 18 is a sectional view of a pixel unit. Referring to FIG. 18, reference numeral 17 denotes a p-type well; 18, a gate oxide film; 19, a first poly-Si layer; 20, a second poly-Si layer; and 21, an n$^+$ floating diffusion (FD) unit. The FD unit 21 is connected to another photo-electric conversion unit via another transfer MOS transistor. In FIG. 18, the drains of the two transfer MOS transistors 3 and FD unit 21 are commonized to attain miniaturization and sensitivity improvement by a capacitance reduction of the FD unit 21. However, the FD unit 21 may be connected using an Al wiring. The transfer MOS transistor 3 operates as an overflow drain MOS when it is OFF.

Figure 19:
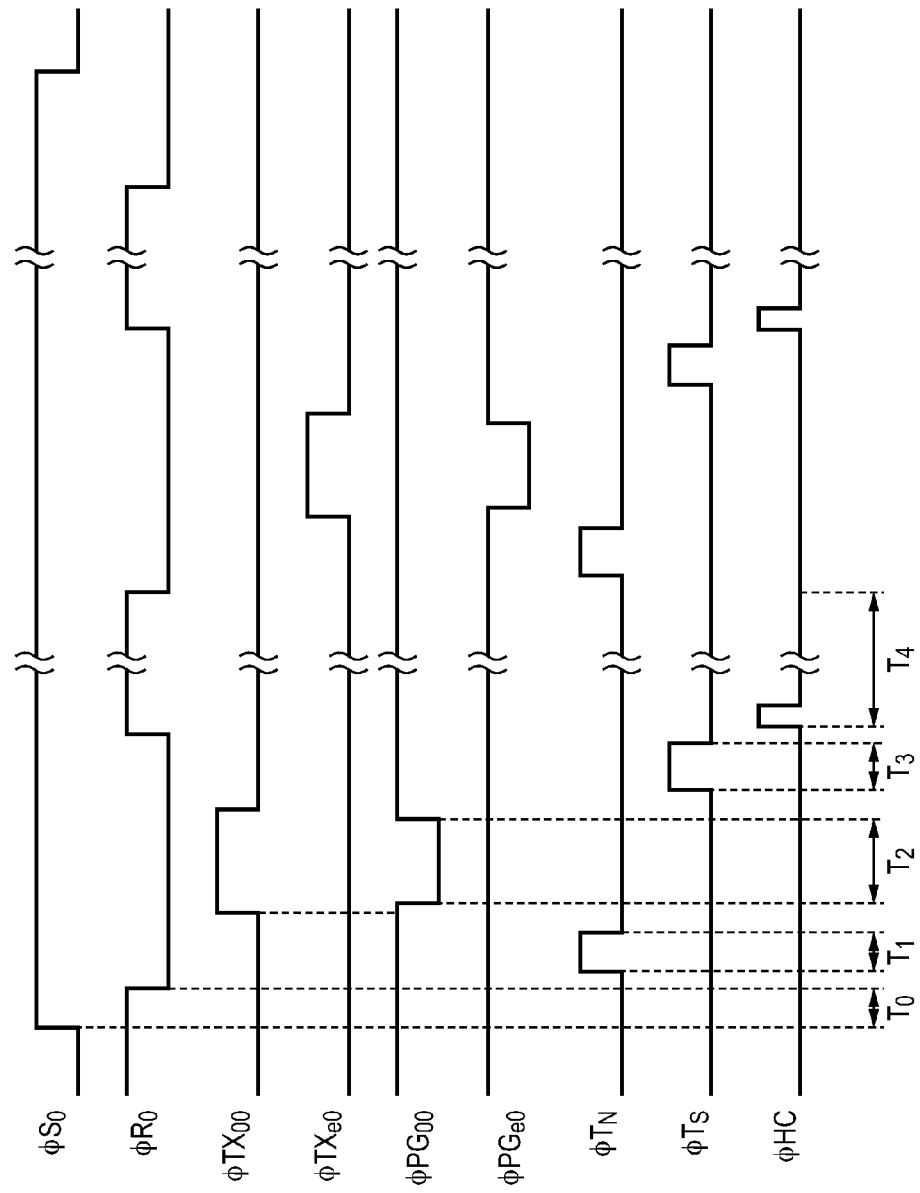
FIG. 19 is a timing chart showing the operation of the area sensor according to the fifth embodiment of the present invention.
Figure 20A:
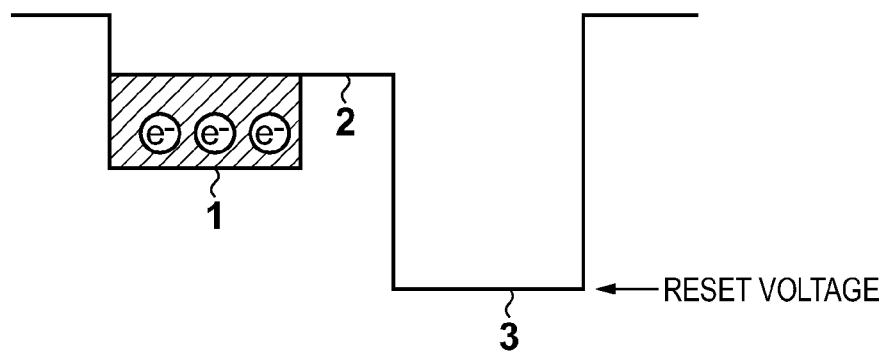
FIGS. 20A to 20E are explanatory views of the prior art.
Figure 20B:
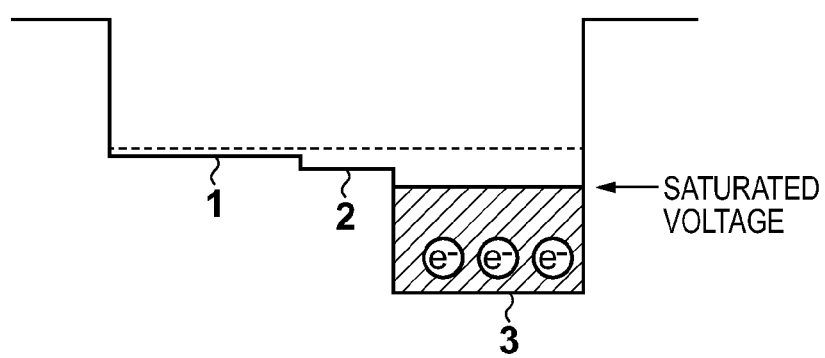
Figure 20C:
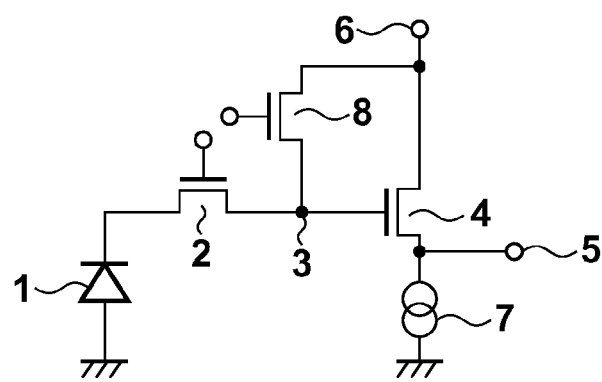
Figure 20D:
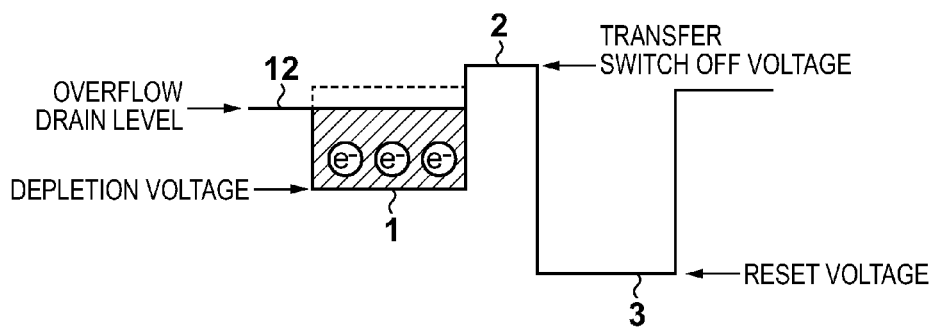
Figure 20E:
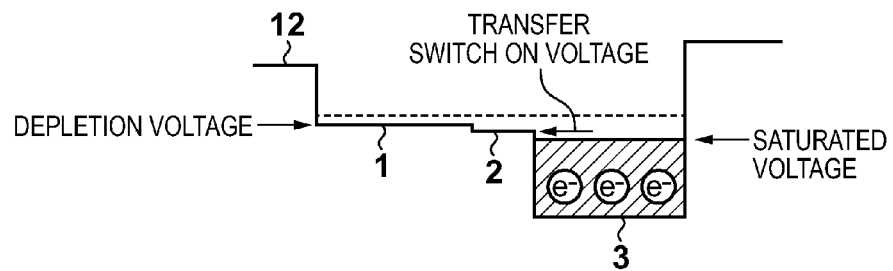
Figure 21:
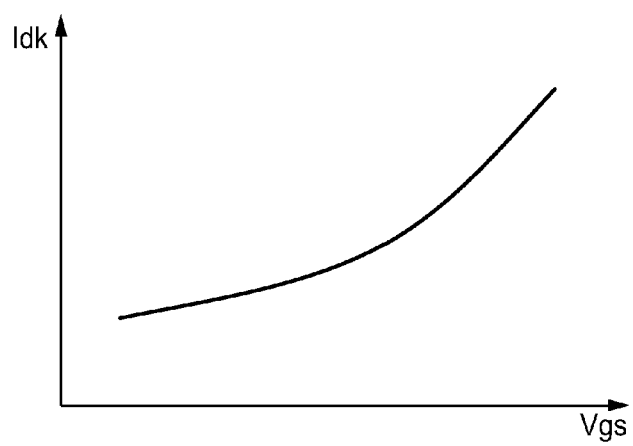
FIG. 21 is a graph showing the characteristics of dark current noise.

An operation will be described below with reference to the timing chart shown in FIG. 19. This timing chart corresponds to a case in which all pixels independently output signals.

A control pulse φL is controlled to Hi in response to a timing output from the vertical scanning circuit 16, thus resetting vertical output lines. Control pulses φ$R_0$, φ$PG_{00}$, and φ$PG_{e0}$ are controlled to Hi to turn on the reset MOS transistors 4, thus controlling the first poly-Si layers 19 of the photo gates 2 to Hi. At time T0, a control pulse φ$S_0$ is controlled to Hi to turn on the selection switch MOS transistors 6, thereby selecting pixel units of first and second lines. Next, a control pulse φ$R_0$ is controlled to Lo to stop resetting of the FD unit units 21 and to set the FD unit units 21 in a floating state, thereby setting the gate-source paths of the source-follower amplifier MOS transistors 5 in a through state. After that, a control pulse φ$T_N$ is controlled to Hi at time T1, thus controlling the FD unit units 21 to output dark voltages to the accumulation capacitor $C_{TN}$ 10 by a source-follower operation.

Next, in order to attain photo-electric conversion outputs of pixels of the first line, a control pulse φ$TX_{00}$ of the first line is controlled to Hi to enable the transistor MOS transistors 3. Then, the control pulse φPG00 is controlled to Lo at time T2. At this time, a voltage relationship in which potential wells spread under the photo gates 2 are raised to completely transfer photo-generation carriers to the FD unit units 21 is preferably used.

Since charges from the photo-electric conversion units 1 of the photodiodes are transferred to the FD unit units 21 at time T2, potentials of the FD unit units 21 change according to light. At this time, since the source-follower amplifier MOS transistors 5 are set in a floating state, the potentials of the FD units 21 are output to the accumulation capacitor $C_{TS}$ 11 by controlling a control pulse φ$T_S$ to Hi at time T3. At this time, dark outputs and light outputs of the pixels of the first line are respectively accumulated on the accumulation capacitors $C_{TN}$ 10 and $C_{TS}$ 11, and a horizontal output line is reset by temporarily controlling a control pulse φHC to Hi at time T4 to enable the horizontal output line reset MOS transistors 13. Then, the dark outputs and light outputs of the pixels are output onto the horizontal output line in response to a scanning timing signal of the horizontal scanning circuit 15 during a horizontal transfer period. At this time, the difference amplifier 14 generates a difference output VOUT between the accumulation capacitors $C_{TN}$ 10 and $C_{TS}$ 11, thus obtaining a high-SN signal in which random noise and fixed pattern noise of pixels are removed. Light charges of pixels 30-12 and 30-22 are accumulated on the corresponding accumulation capacitors $C_{TN}$ 10 and $C_{TS}$ 11 simultaneously with pixels 30-11 and 30-21, but they are read out onto the horizontal output line by delaying a timing pulse from the horizontal scanning circuit 15 by one pixel, and are output from the differential amplifier 14.

After bright outputs are output to the accumulation capacitor CTS 11, the control pulse φ$R_0$ is controlled to Hi to enable the reset MOS transistors 4, thereby resetting the FD units 21 to a power supply $V_{DD}$. After completion of the horizontal transfer operation of the first line, a read-out operation of the second line is executed. In the read-out operation of the second line, the control pulses φ$TX_{e0}$ and φ$PG_{e0}$ are similarly driven, and Hi pulses are supplied as the control pulses φ$T_N$ and φ$T_S$ to accumulate light charges respectively on the accumulation capacitors $C_{TN}$ 10 and $C_{TS}$ 11, thus extracting dark and bright outputs. With the aforementioned drive operations, the read-out operations of the first and second lines can be independently executed. After that, the vertical scanning circuit is scanned to execute read-out operations of (2n+1)-th and (2n+2)-th (n=1, 2, . . . ) lines, so that all pixels can independently output signals. That is, when n=1, a control pulse φ$S_1$ is controlled to Hi, and a control pulse φ$R_1$ is controlled to Lo. Subsequently, control pulses φ$T_N$ and φ$TX_{01}$ are controlled to Hi, a control pulse φ$PG_{01}$ is controlled to Lo, the control pulse φ$T_S$ is controlled to Hi, and the control pulse φHC is temporarily controlled to Hi, thereby reading out pixel signals of pixels 30-31 and 30-32. Subsequently, control pulses φ$TX_{e1}$ and φ$PG_{e1}$, and the same control pulses as in the above description are applied, thereby reading out pixel signals of pixels 30-41 and 30-42.

A saturation amount can be controlled based on a difference between a Hi voltage of the control pulse φPG and a Lo voltage (OFF voltage) of TX of φPG. In an imaging element of complete transfer type, since photo-electrically converted charges are integrated by potential wells of pixel units, a signal POUT cannot be monitored during accumulation. However, as in the first embodiment, the saturation amount is switched by determining an object luminance from an AE sensor. Alternatively, as in the second embodiment, the saturation amount is switched according to an output signal of previous image signals of the imaging sensor 206. Thus, an image signal with a high SN can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-195497, filed Sep. 5, 2012, which is hereby incorporated by reference herein in its entirety.

What is claimed is:

1. A photo-electrical conversion apparatus comprising:
   a sensor including a photodiode for photo-electrically converting an object image and an overflow drain portion connected to the photodiode, wherein a saturated voltage of the photodiode corresponds to a gate OFF voltage of the overflow drain portion; and
   a control unit configured to control the overflow drain portion so as to switch the saturated voltage of the photodiode based on luminance information.

2. The apparatus according to claim 1, wherein said control unit sets the saturated voltage to be a first value for a first luminance, and sets the saturated voltage to be a second value lower than the first value for a second luminance darker than the first luminance.

3. The apparatus according to claim 2, wherein when a contrast of the image signals based on charges accumulated by the sensor is higher than a predetermined value, said control unit sets the saturated voltage to be the first value.

4. The apparatus according to claim 1, wherein said control unit controls the overflow drain portion so as to switch the saturated voltage based on a contrast of image signals based on charges accumulated by the sensor.

5. The apparatus according to claim 1 further comprising:
   a charge accumulation control unit configured to control said sensor to execute a charge accumulation until output levels from said sensor reach a first voltage level based on the saturated voltage.

6. The apparatus according to claim 5, wherein the first voltage level is set at a voltage level lower than the saturated voltage.

7. The apparatus according to claim 5, wherein when the output levels from said sensor do not reach the first voltage level within a predetermined time period, said charge accumulation control unit controls said sensor to terminate the charge accumulation.

8. The apparatus according to claim 1, wherein the overflow drain portion is a switch for resetting the photodiode to a reset voltage.

9. A photo-electrical conversion apparatus comprising:
   a sensor including a photodiode for photo-electrically converting an object image and an overflow drain portion connected to the photodiode, wherein a saturated voltage of the photodiode corresponds to a gate OFF voltage of the overflow drain portion; and
   a control unit configured to control the overflow drain portion so as to switch the saturated voltage of the photodiode based on a sensitivity of said sensor.

10. The apparatus according to claim 9, wherein said control unit sets the saturated voltage to be a first value for a first sensitivity, and sets the saturated voltage to be a second value lower than the first value for a second sensitivity higher than the first sensitivity.

11. The apparatus according to claim 10, wherein said sensor has an arrangement configured to switch between the first sensitivity and the second sensitivity.

12. The apparatus according to claim 9 further comprising:
    a charge accumulation control unit configured to control said sensor to execute a charge accumulation until output levels from said sensor reach a first voltage level based on the saturated voltage.

13. The apparatus according to claim 12, wherein the first voltage level is set at a voltage level lower than the saturated voltage.

14. The apparatus according to claim 12, wherein when the output levels from said sensor do not reach the first voltage level within a predetermined time period, said charge accumulation control unit controls said sensor to terminate the charge accumulation.

15. The apparatus according to claim 9, wherein the overflow drain portion is a switch for resetting the photodiode to a reset voltage.

16. A photo-electrical conversion apparatus comprising:
    a sensor including a photodiode for photo-electrically converting an object image and an overflow drain portion connected to the photodiode, wherein a saturated voltage of the photodiode corresponds to a gate OFF voltage of the overflow drain portion; and
    a control unit configured to control the overflow drain portion so as to switch the saturated voltage of the photodiode based on a period for charge accumulation by said sensor.

* * * * *